(12) United States Patent
Sumiyoshi et al.

(10) Patent No.: US 10,260,213 B2
(45) Date of Patent: Apr. 16, 2019

(54) WORKING MACHINE

(71) Applicant: KUBOTA CORPORATION, Osaka (JP)

(72) Inventors: Ryohei Sumiyoshi, Osaka (JP); Hideo Imai, Osaka (JP); Noriyoshi Kubo, Osaka (JP); Hiroyuki Anami, Osaka (JP); Hiroyuki Hata, Osaka (JP); Toyoaki Yasuda, Osaka (JP); Masahiro Kuroda, Osaka (JP); Kohei Higashiyama, Osaka (JP); Yuji Yamashita, Osaka (JP); Satoshi Tajima, Osaka (JP); Shunichiro Mori, Osaka (JP); Hayato Ido, Osaka (JP); Toshihiko Takemura, Osaka (JP); Shinsuke Hisatake, Osaka (JP); Hajime Tamaki, Osaka (JP); Hiroshi Koyamatsu, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 15/794,468

(22) Filed: Oct. 26, 2017

(65) Prior Publication Data

US 2018/0044885 A1 Feb. 15, 2018

Related U.S. Application Data

(63) Continuation of application No. 15/264,138, filed on Sep. 13, 2016, now Pat. No. 9,828,744, which is a
(Continued)

(30) Foreign Application Priority Data

Sep. 30, 2014 (JP) .................. 2014-202383
Sep. 30, 2014 (JP) .................. 2014-202384
(Continued)

(51) Int. Cl.
*B60K 5/00* (2006.01)
*E02F 9/08* (2006.01)
(Continued)

(52) U.S. Cl.
CPC .............. *E02F 9/0866* (2013.01); *B60K 5/00* (2013.01); *B60K 5/02* (2013.01); *B60K 5/1208* (2013.01);
(Continued)

(58) Field of Classification Search
CPC ........ B60K 5/02; B60K 6/365; B60K 17/105; B60K 5/1208; B60K 17/00; E02F 3/964; E02F 9/0866; E02F 9/16; E02F 9/2004
See application file for complete search history.

(56) References Cited

U.S. PATENT DOCUMENTS 3,715,002 A * 2/1973 Halls ................. G05G 5/08
180/271
5,823,285 A * 10/1998 Tsuchihashi ......... B60K 17/105
180/242
(Continued)

FOREIGN PATENT DOCUMENTS

JP 48-28170 8/1973
JP 57-108479 12/1980
(Continued)

OTHER PUBLICATIONS

Office Action issued in Japan Counterpart Patent Appl. No. 2014-202388, dated Dec. 5, 2017.
(Continued)

*Primary Examiner* — Hau V Phan
(74) *Attorney, Agent, or Firm* — Greenblum & Bernstein, P.L.C.

(57) ABSTRACT

A working machine includes a travel device, a motive power transmission device configured to transmit a motive power
(Continued)

to the travel device, a transmission case configured to house the motive power transmission device, and a hydraulic operation fluid tank disposed on an upper surface of the transmission case.

14 Claims, 31 Drawing Sheets

Related U.S. Application Data continuation of application No. 14/862,441, filed on Sep. 23, 2015, now Pat. No. 9,567,729.

(30) Foreign Application Priority Data

| Sep. 30, 2014 | (JP) | 2014-202388 |
|---|---|---|
| Sep. 30, 2014 | (JP) | 2014-202389 |

(51) Int. Cl.

| E02F 3/34 | (2006.01) |
|---|---|
| E02F 9/16 | (2006.01) |
| B60K 17/00 | (2006.01) |
| B60K 5/02 | (2006.01) |
| B60K 5/12 | (2006.01) |
| B60R 13/08 | (2006.01) |
| B62D 33/063 | (2006.01) |
| E02F 3/42 | (2006.01) |
| E02F 9/02 | (2006.01) |

(52) U.S. Cl.
CPC ........... *B60K 5/1216* (2013.01); *B60K 17/00* (2013.01); *B60R 13/0838* (2013.01); *B62D 33/063* (2013.01); *E02F 3/3414* (2013.01); *E02F 3/422* (2013.01); *E02F 9/02* (2013.01); *E02F 9/0883* (2013.01); *E02F 9/0891* (2013.01); *E02F 9/16* (2013.01); *E02F 9/166* (2013.01); *B60Y 2200/415* (2013.01); *E02F 9/0808* (2013.01)

(56) References Cited

U.S. PATENT DOCUMENTS

| 5,995,895 | A | 11/1999 | Watt | |
|---|---|---|---|---|
| 6,199,646 | B1 | 3/2001 | Tani | |
| 6,325,166 | B1 | 12/2001 | Shimada | |
| 6,971,469 | B2 | 12/2005 | Umemoto | |
| 7,328,760 | B2 | 2/2008 | Inaoka | |
| 7,407,030 | B2 | 8/2008 | Yasuda | |
| 7,416,513 | B2 | 8/2008 | Amann | |
| 8,151,927 | B2 * | 4/2012 | Sakikawa | B60K 7/0015 180/305 |
| 8,607,904 | B2 * | 12/2013 | Fukumoto | B62D 49/0635 180/9.21 |
| 8,851,209 | B2 | 10/2014 | Fukumoto | |
| 9,316,310 | B2 * | 4/2016 | Kinugawa | F16H 61/421 |
| 9,828,744 | B2 * | 11/2017 | Sumiyoshi | B60K 5/02 |
| 2003/0033898 | A1 * | 2/2003 | Morimoto | F16H 59/02 74/335 |
| 2004/0149462 | A1 | 8/2004 | Okamoto | |
| 2005/0139034 | A1 * | 6/2005 | Komine | E02F 9/2004 74/566 |
| 2008/0252102 | A1 * | 10/2008 | Fukunaga | B60R 13/0815 296/190.08 |
| 2008/0296032 | A1 * | 12/2008 | Masumoto | E02F 9/2004 172/321 |
| 2009/0029826 | A1 | 1/2009 | Eguchi | |
| 2009/0242302 | A1 * | 10/2009 | Fujiki | A01B 51/026 180/89.12 |
| 2009/0248258 | A1 * | 10/2009 | Fukumoto | A01B 79/005 701/50 |
| 2009/0250972 | A1 * | 10/2009 | Endou | B62D 33/07 296/190.06 |
| 2009/0301429 | A1 | 12/2009 | Takashina | |
| 2011/0093150 | A1 * | 4/2011 | Yanagisawa | B60K 6/365 701/22 |
| 2011/0175005 | A1 * | 7/2011 | Sakamoto | E02F 3/964 251/129.01 |
| 2011/0303045 | A1 * | 12/2011 | Masumoto | G05G 1/06 74/504 |
| 2012/0191307 | A1 * | 7/2012 | Matsuzaki | B60W 10/06 701/51 |
| 2013/0036729 | A1 * | 2/2013 | Kinugawa | F16H 61/421 60/446 |
| 2013/0213178 | A1 * | 8/2013 | Masumoto | G05G 1/04 74/523 |

FOREIGN PATENT DOCUMENTS

| JP | 01-93178 | 6/1989 |
|---|---|---|
| JP | 02-143326 | 12/1990 |
| JP | 05-063949 | 8/1993 |
| JP | 2005 222330 | 8/2005 |
| JP | 2010-65437 | 3/2010 |
| JP | 2011-031844 | 2/2011 |
| JP | 2011-088589 | 5/2011 |
| JP | 5541709 | 1/2012 |
| JP | 2012-207531 | 10/2012 |
| JP | 2014-177924 | 9/2014 |
| WO | 2005035883 | 11/2007 |

OTHER PUBLICATIONS

Notification of Reasons for Refusal issued with respect to corresponding Japanese Application No. P 2014-202389, dated Jul. 25, 2017.

Notification of Reasons for Refusal issued with respect to corresponding Japanese Application No. P 2014-202383, dated Jul. 25, 2017.

Notification of Reasons for Refusal issued with respect to counterpart Japanese Application No. P 2014-202384, dated Oct. 3, 2017.

\* cited by examiner

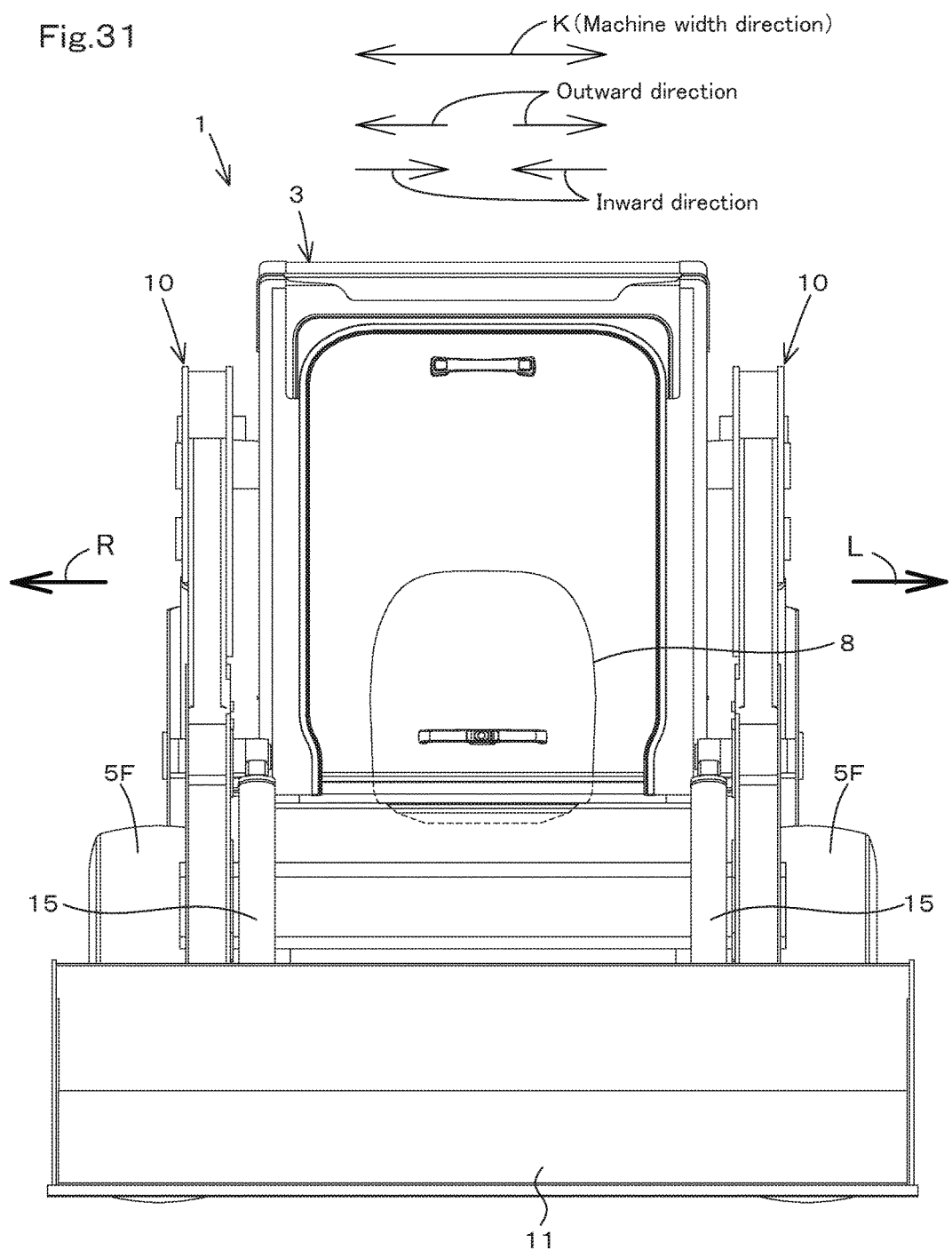

WORKING MACHINE

CROSS-REFERENCE TO RELATED APPLICATIONS

The present application is a continuation of U.S. application Ser. No. 15/264,138 filed on Sep. 13, 2016, which is a continuation of U.S. application Ser. No. 14/862,441 filed on Sep. 23, 2015, which claims priority under 35 U.S.C. § 119 to Japanese Patent Application No. 2014-202384, filed Sep. 30, 2014, to Japanese Patent Application No. 2014-202383, filed Sep. 30, 2014, to Japanese Patent Application No. 2014-202389, filed Sep. 30, 2014, and to Japanese Patent Application No. 2014-202388, filed Sep. 30, 2014. The entire contents of these applications are incorporated herein by reference in their entireties.

BACKGROUND OF THE INVENTION

Field of the Invention

The present invention relates to a working machine such as a skid steer loader, a track loader, and a compact track loader.

Description of Related Art

Working machines disclosed in Japanese Unexamined Patent Application Publication No. 2010-65437 and Japanese Patent Publication No. 5541709 are previously known.

The working machine disclosed in Japanese Unexamined Patent Application Publication No. 2010-65437 includes: a machine body; an engine mounted on the machine body; an output shaft protruding from a rear portion of the engine; and a mount member for supporting the engine to suppress vibration of the engine.

The mount member includes a first support member, an elastic member, and a second support member. The first support member is constituted of a first arm disposed on a right side (a right arm), a second arm disposed on a left side (a left arm), and an attachment member attached to both of the first arm and the second arm. The first arm, the second arm, and the attachment member are each formed of a plate member. The first arm is fixed by bolts to a right side surface of a rear portion of a crankcase of the engine. The second arm is fixed by bolts to a left side surface of a left portion of the crankcase of the engine. The first arm and the second arm protrude backward from the engine. The attachment member is fixed by bolts to the right arm and the left arm, the right arm and the left arm protruding backward from the engine. The elastic member is formed of rubber, and is disposed on the attachment member, the attachment member being included in the first support member. The second support member is disposed on the machine body to support the elastic member.

The working machine disclosed in Japanese Patent Publication No. 5541709 includes mount members, one of the mount members being disposed on a right side of a rear portion of an engine, the other one of the mount members being disposed on a left side of the rear portion of the engine. The mount member disposed on the right side includes a first support member, an elastic member, and a second support member. The mount member disposed on the left side also includes a first support member, an elastic member, and a second support member. The first supports members each include an attachment plate, an arm, and a support plate. The attachment plate is fixed by bolts to a side surface of a crankcase. The arm protrudes sideward (sideways) from the attachment plate. The support plate is fixed to the attachment plate and the arm. The elastic member is attached to the support plate.

A working machine disclosed in Japanese Unexamined Patent Application Publication No. 2012-207531 is previously known. The working machine includes a machine body, a travel device disposed on a right side of the machine body, a travel device disposed on a left side of the machine body, an operator seat mounted on the machine body, an operation lever disposed on a right side of the operator seat, and an operation lever disposed on a left side of the operator seat.

A working machine disclosed in Japanese Unexamined Patent Application Publication No. 2012-207531 is previously known. The working machine includes a machine body, an actuator, and a control valve configured to control a hydraulic operation fluid (a hydraulic oil), the hydraulic operation fluid being used for actuating the actuator. In addition, the working machine includes an operator seat mounted on the machine body. The control valve is disposed in rear of the operator seat.

A working machine disclosed in Japanese Unexamined Patent Application Publication No. 2012-207531 is previously known. The working machine includes a machine body, and a travel device disposed outside the machine body. In addition, the working machine has a hydraulic operation fluid tank storing a hydraulic operation fluid, the hydraulic operation fluid being used for actuating a hydraulic actuator installed to the working machine. The hydraulic operation fluid tank is placed on a bottom portion of an inside of the machine body.

The previously-known working machine does not include a transmission case, the transmission case being configured to house a motive power transmission device for transmitting a motive power to the travel device. In addition, the working machine is provided with a cabin mounted on the machine body. The cabin is pivotally supported on the machine body at a rear portion of the cabin, and is capable of being lifted up.

BRIEF SUMMARY OF THE INVENTION

Problems to be Solved by the Invention

In the working machine disclosed in Japanese Unexamined Patent Application Publication No. 2010-65437, the first arm and the second arm are each fixed by bolts to the side surface of a rear portion of the crankcase, the bolts being screwed from the side, and accordingly the working machine is required to have a space on both sides of the rear portion of the crankcase, the space being used for the attachment of the first arm and the second arm. In addition, one of the attachment members is attached to the first arm, the other one of the attachment members is attached to the second arm, and thus both of the first arm and the second arm protrude from the rear portion of the crankcase.

Moreover, in the working machine disclosed in Japanese Patent Publication No. 5541709, the first support member of the mount member disposed on the right side is fixed to the right side surface of the crankcase, and the first support member of the mount member disposed on the left side is fixed to the left side surface of the crankcase. Accordingly the working machine is required to have a space on both sides of the rear portion of the crankcase, the space being used for the attachment of the first support members. In addition, the mount member disposed on the right side is disposed on the side surface of the rear portion of the crankcase, protruding from the side surface, and the mount member disposed on the left side is disposed on the side surface of the rear portion of the crankcase, protruding from the side surface.

Thus, the working machine previously known has a problem that the mount members interrupt the layout of and the maintenance of parts disposed around the rear portion of the engine.

To solve the above mentioned problems, the present invention intends to provide a working machine capable of improving the layout of and the maintenance of parts disposed around the rear portion of the engine.

In the working machine previously disclosed in Japanese Unexamined Patent Application Publication No. 2012-207531, the operation lever disposed on the right side is attached (installed) separately from the operation lever disposed on the left side, and each of the operation levers has to be continuously supported during the attachment to the attachment member. Accordingly, the attachment of the operation levers takes a long time.

To solve the above mentioned problems, the present invention intends to simplify the attachment of the operation levers, one of the operation levers being disposed on the right side of the operator seat, the other one of the operation levers being disposed on the left side of the operator seat.

In the working machine including pedals at a foot of the operator seat, the pedals being configured to operate the control valve, the control valve is far from the pedals when the control valve is disposed in rear of the operator seat. Accordingly, the working machine requires a long mechanical linkage for connecting the control valve to the pedals, thereby requiring a large space, the large space being used for forming a passage allowing arrangement of the long mechanical linkage. Meanwhile, it is considered to dispose the control valve on a front portion of the machine body at the foot of the operator seat, thereby shortening a distance between the pedals and the control valve. When the control valve is mounted directly on a bottom portion of the machine body in the working machine arranging the control valve on the front portion of the machine body, there is a possibility that mud is deposited on the control valve.

To solve the above mentioned problems, the present invention intends to provide a working machine capable of preventing the deposit of mud on the control valve even when the control valve is mounted at the foot of the operator seat.

In the working machine including the transmission case on the machine body, the transmission case being configured to house the motive power transmission device for transmitting a motive power to the travel device, the working machine is required to have a space, the space being used for disposing the hydraulic operation fluid tank.

In addition, the working machine includes a gas spring in an internal portion of the machine body, the gas spring being configured to lift up the cabin, and accordingly it is also required for the working machine to have a space for installation of the gas spring.

To solve the above mentioned problems, the present invention intends to provide a working machine capable of preparing a space for installation of the hydraulic operation fluid tank and/or the gas spring, the working machine including a transmission case on the machine body, the transmission case being configured to house a motive power transmission device for transmitting a motive power to a travel device.

Means of Solving the Problems

To solve the above-mentioned technical problems, techniques that the present invention provides are characterized in the following points.

In a first aspect of the present invention, a working machine comprising: a machine body; a motor mounted on the machine body; an output shaft protruding from a rear portion of the motor; a rear attachment portion disposed on the rear portion of the motor, the rear attachment portion facing backward; and a mount member configured to support the motor to suppress vibration of the motor, the mount member including: a first support member having an opposite attachment portion, the opposite attachment portion being attached opposite to the rear attachment portion; an elastic member attached to the first support member; and a second support member disposed on the machine body, the second support member being configured to support the elastic member.

In a second aspect of the present invention, the working machine according to the first aspect, wherein the rear attachment portion includes: a first attachment portion; and a second attachment portion, and the first support member has a width equal to or less than an interval between: an outside surface of the first attachment portion; and an outside surface of the second attachment portion.

In a third aspect of the present invention, the working machine according to the second aspect, wherein the opposite attachment portion includes: a third attachment portion attached to the first attachment portion; and a fourth attachment portion attached to the second attachment portion, and the first support member includes: a first arm portion extending backward from the third attachment portion; and a second arm portion extending backward from the fourth attachment portion.

In a fourth aspect of the present invention, the working machine according to the third aspect, wherein the first support member includes: a joint portion configured to joint the first arm portion to the second arm portion, the joint portion being configured to mount the elastic member.

In a fifth aspect of the present invention, the working machine according to the first aspect, wherein the second support member includes: a fixation portion attached to the machine body; and a protruding member protruding upward from the fixation portion, and the first support member includes: a rim forming an insertion hole, the insertion hole being used for insertion of the protruding member.

In a sixth aspect of the present invention, the working machine according to the first aspect, wherein the elastic member includes: a restriction member, the first support member includes: a stopper configured to restrict a deformation amount of the elastic member, and the stopper includes: a first protruding portion protruding downward, the first protruding portion being configured to contact to the second support member; and a second protruding portion protruding upward, the second protruding portion being configured to contact to the restriction member attached to the elastic member.

In a seventh aspect of the present invention, the working machine according to the first aspect, including: a bumper portion disposed on an rear end of the machine body; and a hydraulic hose disposed between the second support member and the bumper portion, wherein the motor is arranged on a rear portion of the machine body.

In an eighth aspect of the present invention, the working machine according to the first aspect, comprising: a bonnet configured to cover a rear portion of the motor; a ride control valve; a bucket level control valve; and a quick hitch valve, wherein the motor is arranged on the rear portion of the machine body, and the ride control valve, the bucket level control valve, and the quick hitch valve are disposed on a side of the motor in front of the bonnet.

In a ninth aspect of the present invention, the working machine according to the first aspect, comprising: a bonnet configured to cover a rear portion of the motor; and an oil filter, wherein the motor is arranged on the rear portion of the machine body, and the oil filter is disposed on a side of the motor in front of the bonnet.

To solve the above-mentioned technical problems, techniques that the present invention provides are characterized in the following points.

In a tenth aspect of the present invention, a working machine comprising: a machine body; a first travel device disposed on a right side of the machine body; a second travel device disposed on a left side of the machine body; a motive power transmission device configured to transmit a motive power to the travel device; a first transmission case disposed on the right side of the machine body, the first transmission case being configured to house the motive power transmission device; a second transmission case disposed on the left side of the machine body, the second transmission case being configured to house the motive power transmission device; an operator seat mounted on the machine body; a first operation lever disposed on a right side of the operator seat; a second operation lever disposed on a left side of the operator seat; a first attachment member attached on the first transmission case disposed on the right side; a second attachment member attached on the second transmission case disposed on the left side; and a joint member configured to joint the first attachment member to the second attachment member, the joint member being configured to support the first operation lever and the second operation lever, the first operation lever and the second operation lever being capable of freely swinging.

In an eleventh aspect of the present invention, the working machine according to the tenth aspect, including: a right stopper disposed on the first attachment member, the right stopper being configured to restrict a distance of swinging of the first operation lever disposed on the right side; and a left stopper disposed on the second attachment member, the left stopper being configured to restrict a distance of swinging of the second operation lever disposed on the left side.

In a twelfth aspect of the present invention, the working machine according to the tenth aspect, including a first cover arranged under the operator seat; a hinge disposed on one end of the first cover; and a second cover jointed to the hinge; wherein the first cover includes: a rim forming at least one through hole for insertion of the first operation lever and the second operation lever.

In a thirteenth aspect of the present invention, the working machine according to the twelfth aspect, wherein at least one of the first cover and the second cover includes: a wall portion configured to form a space for housing air.

To solve the above-mentioned technical problems, techniques that the present invention provides are characterized in the following points.

In a fourteenth aspect of the present invention, a working machine comprising: a machine body; an actuator; a control valve configured to control a hydraulic operation fluid, the hydraulic operation fluid being used for operating the actuator; and a support base disposed on a front side of the machine body, the support base including: an attachment portion attached to a bottom portion of the machine body; a leg portion standing upward from the attachment portion; and a mount portion disposed on an upper side of the leg portion, the mount portion being configured to mount the control valve.

In a fifteenth aspect of the present invention, the working machine according to the fourteenth aspect, comprising: a pedal configured to operate the control valve, wherein the support base includes: a pedal attachment portion for attachment of the pedal.

In a sixteenth aspect of the present invention, the working machine according to the fourteenth aspect, comprising: an operator seat mounted on the machine body; and a floor step disposed in front of the operator seat, wherein the mount portion is disposed below the floor step.

In a seventeenth aspect of the present invention, the working machine according to the fourteenth aspect, comprising: a case disposed inside the machine body; and a hydraulic pipe disposed from the control valve toward a rear portion of the machine body along a side portion of the machine body, the hydraulic pipe being fixed to the case.

In an eighteenth aspect of the present invention, the working machine according to the fourteenth aspect, comprising: a rim disposed on a corner portion between a front portion of the machine body and a bottom portion of the machine body, the rim forming an cleaning opening; and a support base disposed on the bottom portion.

To solve the above-mentioned technical problems, techniques that the present invention provides are characterized in the following points.

In a nineteenth aspect of the present invention, a working machine comprising: a machine body; a travel device arranged on an outside of the machine body; a motive power transmission device configured to transmit a motive power to the travel device; a transmission case configured to house the motive power transmission device; and a hydraulic operation fluid tank disposed on an upper surface of the transmission case.

In a twentieth aspect of the present invention, a working machine comprising: a machine body; a travel device arranged on an outside of the machine body; a motive power transmission device configured to transmit a motive power to the travel device; a pair of transmission cases configured to house the motive power transmission device, one of the transmission case being disposed on a right portion of the machine body, the other one of the transmission case being disposed on a left portion of the machine body; and a hydraulic operation fluid tank disposed on an upper surface of any one of the pair of transmission cases.

In a twenty-first aspect of the present invention, a working machine comprising: a machine body; a cabin mounted on the machine body, the cabin being capable of swinging upward and downward; a travel device arranged on an outside of the machine body; a motive power transmission device configured to transmit a motive power to the travel device; a transmission case configured to house the motive power transmission device; and a plurality of gas springs disposed on an upper surface of the transmission case, the gas springs being configured to lift up the cabin.

In a twenty-second aspect of the present invention, a working machine comprising: a machine body; a cabin mounted on the machine body, the cabin being capable of swinging upward and downward; a travel device arranged on an outside of the machine body; a motive power transmission device configured to transmit a motive power to the travel device; a pair of transmission cases configured to house the motive power transmission device, one of the transmission case being disposed on a right portion of the machine body, the other one of the transmission case being disposed on a left portion of the machine body; and a plurality of gas springs disposed on an upper surface of any one of the pair of transmission cases, the gas springs being configured to lift up the cabin.

In a twenty-third aspect of the present invention, a working machine comprising: a machine body; a cabin mounted on the machine body, the cabin being capable of swinging upward and downward; a travel device arranged on an outside of the machine body; a motive power transmission device configured to transmit a motive power to the travel device; a pair of transmission cases configured to house the motive power transmission device, one of the transmission case being disposed on a right portion of the machine body, the other one of the transmission case being disposed on a left portion of the machine body; a hydraulic operation fluid tank on an upper surface of any one of the pair of transmission cases, and a plurality of gas springs disposed on an upper surface of the other one of the pair of transmission cases, the gas springs being configured to lift up the cabin.

In a twenty-fourth aspect of the present invention, the working machine according to the nineteenth aspect, comprising: a first boom arranged on a right side of the machine body, the first boom being capable of swinging upward and downward; and a second boom arranged on a left side of the machine body, the second boom being capable of swinging upward and down ward, wherein the hydraulic operation fluid tank includes: a fluid filler tube having a fluid filler opening; and an fluid gauge, and the fluid filler opening and the fluid gauge are disposed below the booms.

In a twenty-fifth aspect of the present invention, the working machine according to the twenty-fourth aspect, comprising: a front wheel disposed on the travel device; and a rear wheel disposed on the travel device, wherein the fluid filler opening and the fluid gauge are disposed between the front wheel and the rear wheel.

In a twenty-sixth aspect of the present invention, the working machine according to the twenty-first aspect, comprising: a first pin configured to pivotally support a lower end portion of the plurality of gas springs; and a second pin configured to pivotally support an upper end portion of the plurality of gas springs.

In a twenty-seventh aspect of the present invention, the working machine according to the twenty-first aspect, comprising: a restriction member configured to restrict stretching and shortening of at least one of the plurality of gas springs, the restriction member having two positions; one of the two positions is a restricting position where the restriction member contacts to the gas spring to restrict the stretching and shortening of the gas spring, and the other one of the two positions is an allowance position where the restriction member is released from the restricting position to allow the stretching and shortening of the gas spring.

In a twenty-eighth aspect of the present invention, the working machine according to the nineteenth aspect, wherein the machine body includes: a side member, the transmission case includes: the side member; and a cover arranged on a side of the side member, the side being opposite to the travel device.

In a twenty-ninth aspect of the present invention, the working machine according to the twenty-eighth aspect, wherein the side member includes: a first plate member; and a second plate member standing up from the first plate member, the cover includes: a third plate member disposed to be opposite to the second plate member; and a fourth plate member placed above the first plate member to be opposite to the first plate member, and an outer surface of the fourth plate member serves as an upper surface of the transmission case.

Effects of the Invention

According to the present invention, a rear attachment portion is disposed on a rear portion of the motor, the rear attachment portion facing backward, and a mount member supports the motor to suppress vibration of the motor, the mount member including a first support member having an opposite attachment portion attached to be opposite to the rear attachment portion, and further, the first support member of the mount member is attached to the rear attachment portion from behind the motor, the rear attachment portion being disposed on the rear portion of the motor. In this manner, a space is not required on a right side of and on a left side of the rear portion of the motor, the space being used for attachment of the first support member, thereby the mount member allows the good layout of and the easy maintenance of parts disposed around the rear portion of the motor.

According to the present invention, a joint member joints the first attachment member to the second attachment member, the first attachment member being attached to a right transmission case, the second attachment member being attached to a left transmission case. And, the joint member supports a right operation lever and a left operation lever, the first operation lever and the second operation lever being capable of freely swinging. In this manner, the first attachment member, the second attachment member, and the right and left operation levers are assembled to be one component. The assembled component can be placed on the transmission cases from above and can be assembled to the transmission cases, thereby simplifying the assembly of the operation levers.

According to the present invention, a support base is disposed on a front side of the machine body, the support base including: an attachment portion attached to a bottom portion of the machine body; a leg portion standing upward from the attachment portion; and a mount portion disposed on an upper side of the leg portion, the mount portion being configured to mount the control valve. In this manner, the control valve can be installed being floated (separated upward) from a bottom portion of the machine body, and thereby the control valve can be prevented from deposition of mud on the control valve when the control valve is placed at a foot of the operator seat.

According to the present invention, a hydraulic operation fluid tank is disposed on an upper surface of the transmission case, the transmission case being configured to house a motive power transmission device for transmitting a motive power to a travel device. In this manner, an installation place for the hydraulic operation fluid tank can be formed.

In addition, according to the present invention, a plurality of gas springs are disposed on an upper surface of the transmission case, the gas springs being configured to lift up the cabin. In this manner, an installation place for the plurality of gas springs can be formed. The present invention can form an installation place for the hydraulic operation fluid tank and/or the gas springs by efficiently using the upper surface of the transmission case.

BRIEF DESCRIPTION OF THE DRAWINGS

FIG. 31 is a front view of the working machine according to the embodiment.

DESCRIPTION OF THE EMBODIMENTS

Referring to drawings, an embodiment of the present invention will be described below.

Figure 29:
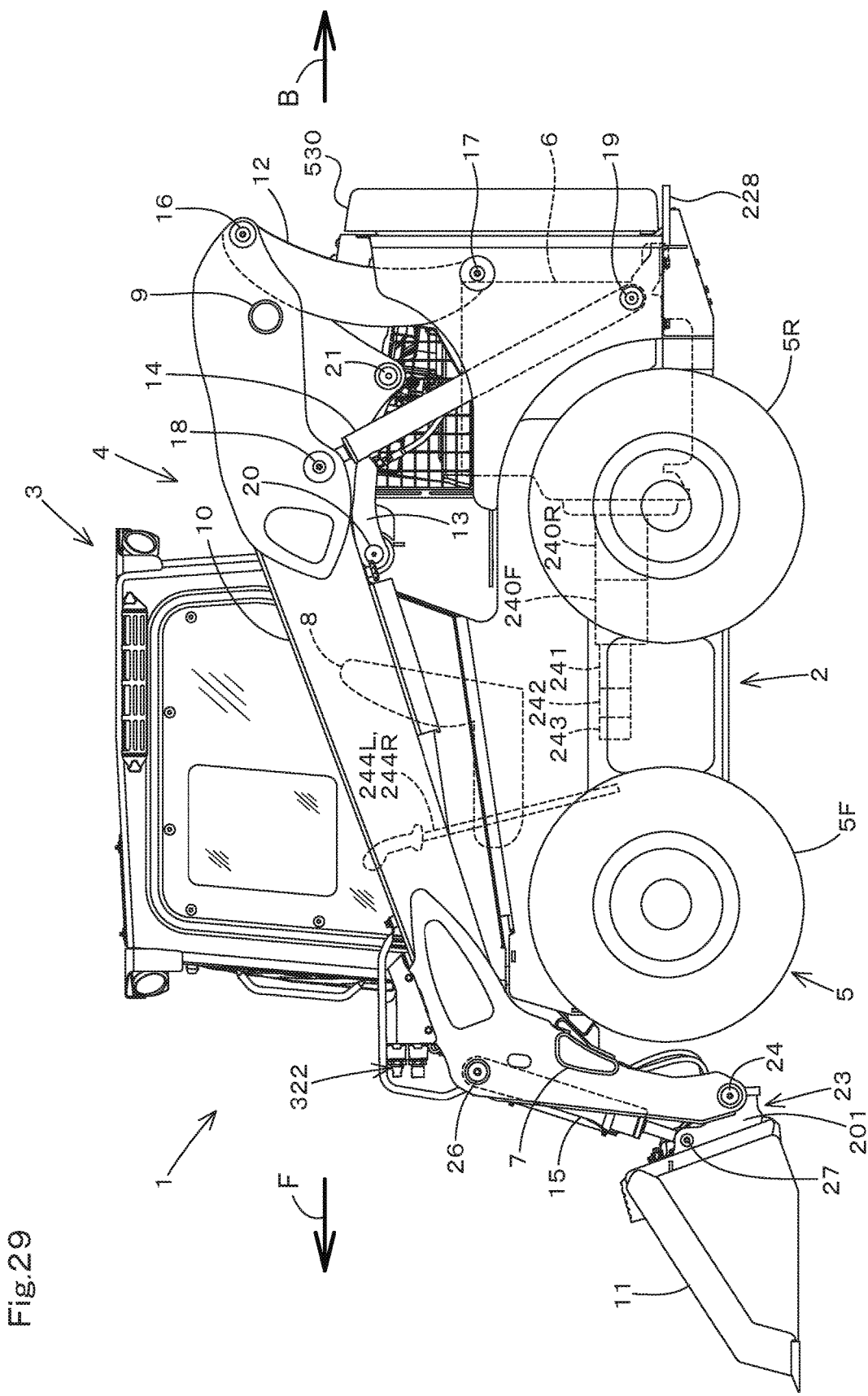
FIG. 29 is a side view of a working machine according the embodiment.
Figure 30:
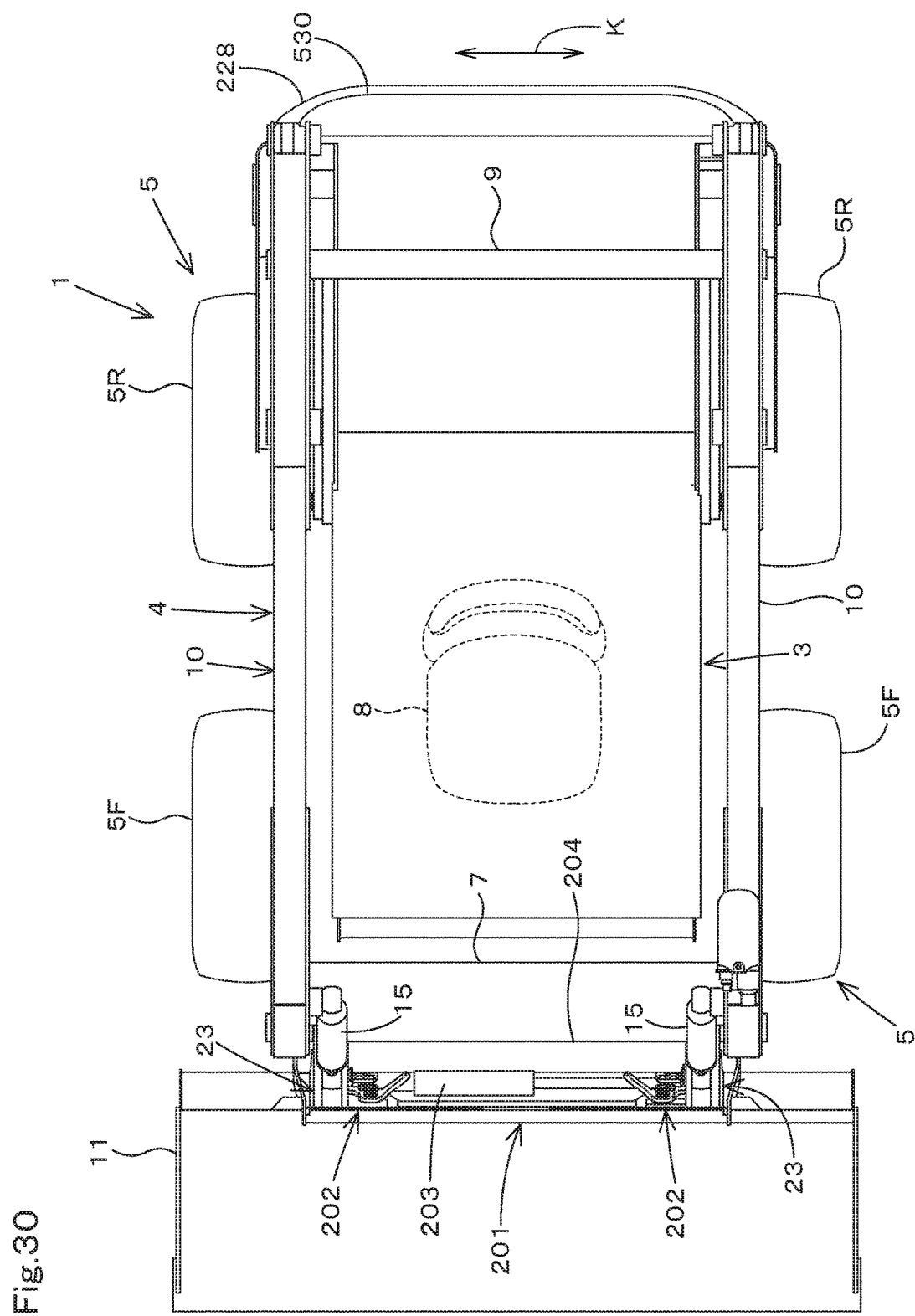
FIG. 30 is a plan view of the working machine according to the embodiment.

FIG. 29 is a side view of a working machine 1 according to an embodiment of the present invention. FIG. 30 is a plan view of the working machine 1. FIG. 31 is a front view of the working machine 1.

FIG. 29 to FIG. 31 show a Skid Steer Loader (SSL) as an example of the working machine 1 according to the embodiment of the present invention. However, the working machine of the present invention is not limited to the Skid Steer Loader (SSL), and can be other types of the working machine, for example, a Track Loader (TL), a Compact Track Loader (CTL), and the like.

The skid steer loader 1 is the working machine 1 according to the embodiment. The skid steer loader 1 includes a body 2 of the working machine (hereinafter referred to as a machine body 2), a cabin 3, an operation device 4, and travel devices 5. The cabin 3 is mounted on the machine body 2. An operator seat 8 is provided in the cabin 3. The operation device 4 is attached on the machine body 2. The skid steer loader 1 includes two travel devices 5; one of the travel devices 5 is provided on a right side of the machine body 2, and the other one is provided on a left side of the machine body 2. A motor 6 is mounted on a rear portion of the machine body 2. The motor 6 is an engine, an electric motor, and the like. The skid steer loader 1 according to the embodiment employs a diesel engine.

Hereinafter, in explanations of the embodiment of the present invention and in explanations of the modified examples of the embodiment, a forward direction (a direction shown by an arrowed line F in FIG. 29) corresponds to a front side of an operator seating on the operator seat 8 of the skid steer loader 1, a backward direction (a direction shown by an arrowed line B in FIG. 29) corresponds to a back side of the operator, a leftward direction (a direction shown by an arrowed line L in FIG. 31) corresponds to a left side of the operator, and a rightward direction (a direction shown by an arrowed line R in FIG. 31) corresponds to a right side of the operator.

In addition, in explanations of the embodiment of the present invention and in explanations of the modified examples of the embodiment, a direction from the front side shown by the arrowed line F toward the back side shown by the arrowed line B (or a direction from the back side shown by the arrowed line B toward the front side shown by the arrowed line A) is referred to as a front to rear direction (or a rear to front direction), and a horizontal direction perpendicular to the front to rear direction (or the rear to front direction) is a direction K along a width of the machine body 2. The direction K along the width of the machine body 2 is hereinafter referred to as the machine width direction K. As shown in FIG. 31, in the following description, a direction from a center portion of the machine body 2 toward the above mentioned right side can be referred to as an outward direction. And, a direction from the center portion of the machine body 2 toward the above mentioned left side can be also referred to as the outward direction. The outward direction is hereinafter referred to as a machine outward direction. In other words, the machine outward direction corresponds to a direction departing from the center portion of the machine body 2 in the machine width direction K. A direction opposite to the machine outward direction can be referred to as an inward direction. The inward direction is hereinafter referred to as a machine inward direction. In other words, the machine inward direction corresponds to a direction toward the center portion of the machine body 2 in the machine width direction K.

As shown in FIG. 29 and FIG. 31, the operation device 4 includes booms 10, an operation tool 11, lift links 12, control links 13, boom cylinders 14, and bucket cylinders 15.

The operation device 4 includes two booms 10; one of the booms 10 is provided on a right side of the cabin 3 (referred to as the right boom 10) and is capable of freely swinging upward and downward, and the other one is provided on a left side of the cabin 3 (referred to as the left boom 10) and is capable of freely swinging upward and downward. The operation tool 11 is a bucket (hereinafter referred to as a bucket 11), for example. The bucket 11 is provided on tip portions (front end portions) of the booms 10 and is capable of freely swinging upward and downward. The lift link 12 and the control link 13 support a base portion (a rear portion) of the boom 10 so that the boom 10 is capable of freely swinging upward and downward. The boom cylinder 14 is capable of being stretched and shortened, thereby moving the boom 10 upward and downward. The bucket cylinder 15 is capable of being stretched and shortened, thereby swinging the bucket 11.

The operation device 4 includes a joint pipe 7 having a deformed shape, that is, the joint pipe 7 being a deformed pipe. The joint pipe 7 is connected to a front portion of the right boom 10 and to a front portion of the left boom 10 between the right boom 10 and the left boom 10, thereby jointing the right boom 10 and the left boom 10 with each other.

The operation device 4 includes a joint pipe 9 having a cylindrical shape, that is, the joint pipe 9 being a cylindrical pipe. The joint pipe 9 is connected to a base portion (a rear portion) of the right boom 10 and to a base portion (a rear portion) of the left boom 10 between the right boom 10 and the left boom 10, thereby jointing the right boom 10 and the left boom 10 with each other.

The operation device 4 includes two lift links 12, two control links 13, and two boom cylinders 14. One of the lift links 12 (the right lift link 12), one of the control links 13 (the right control link 13), and one of the boom cylinders 14 (the right boom cylinder 14) are provided on a right side of the machine body 2, corresponding to the right boom 10 (also referred to as the corresponding boom 10). And, the other one of the lift links 12 (the left lift link 12), the other one of the control links 13 (the left control link 13), and the other one of the boom cylinders 14 (the left boom cylinder 14) are provided on a left side of the machine body 2, corresponding to the left boom 10 (also referred to as the corresponding boom 10).

The lift link 12 is vertically provided on a rear portion of the base portion of the boom 10. The lift link 12 is supported at an upper portion of the lift link 12 by a pivot shaft 16 (a first pivot shaft) to be capable of freely turning around a horizontal axis of the pivot shaft 16, the lift link 12 being supported on the rear portion of the base portion of the boom 10 by the pivot shaft 16. In addition, the lift link 12 is supported at a lower portion of the lift link 12 by a pivot shaft 17 (a second pivot shaft) to be capable of freely turning around a horizontal axis of the pivot shaft 17, the lift link 12 being supported on the rear portion of the machine body 2 by the pivot shaft 16. The second pivot shaft 17 is disposed lower than the first pivot shaft 16.

The boom cylinder 14 is supported at an upper portion of the boom cylinder 14 by a pivot shaft 18 (a third pivot shaft) to be capable of freely turning around a horizontal axis of the pivot shaft 18. The third pivot shaft 18 is disposed on the base portion of the boom 10 in front of the first pivot shaft 16. The boom cylinder 14 is supported at a lower portion of the boom cylinder 14 by a pivot shaft 19 (a fourth pivot shaft) to be capable of freely turning around a horizontal axis of the pivot shaft 19. The fourth pivot shaft 19 is disposed on a lower portion of the rear portion of the machine body 2, being lower than the third pivot shaft 18.

The control link 13 is disposed in front of the lift link 12. One end of the control link 13 is supported by a pivot shaft 20 (a fifth pivot shaft) to be capable of freely turning around a horizontal axis of the pivot shaft 20. The fifth pivot shaft 20 is disposed on the machine body 2. The other end of the control link 13 is supported by a pivot shaft 21 (a sixth pivot shaft) to be capable of freely turning around a horizontal axis of the pivot shaft 21. The sixth pivot shaft 21 is disposed on the boom 10 in front of the second pivot shaft 17, being higher than the second pivot shaft 17.

Stretching and shortening of the boom cylinder 14 swing the boom 10 upward and downward around the first pivot shafts 16, the boom 10 being supported on the base portion of the boom 10 by the lift link 12 and the control link 13, thereby moving a tip portion of the boom 10 upward and down ward. The control link 13 is swung upward and downward around the fifth pivot shaft 20 by the swinging upward and downward of the boom 10. The lift link 12 is swung forward and backward around the second pivot shaft 17 by the swinging upward and downward of the control link 13.

An attachment device 201 is disposed on each of the front portions (the tip portions) of the booms 10. The bucket 11 is capable of being attached to and detached from the attachment device 201. The attachment device 201 includes an attachment body 23, a lock mechanism 202, and a lock cylinder 203.

A pivot pin 24 is disposed on each of the front portions of the booms 10, and an attachment body 23 is pivotally supported on the front portions (the tip portions) of the booms 10. The bucket 11 is attached to the attachment body 23 and is capable of being freely attached and detached. The attachment body 23 is supported on the front portions of the booms 10 by the pivot pin 24, thereby being capable of freely turning about a horizontal axis of the pivot pin 24. The attachment body 23 disposed on the right side is jointed to the attachment body 23 disposed on the left side by a joint member 204.

The lock mechanism 202 prevents the bucket 11 from being detached from the attachment body 23. The lock cylinder 203 moves the lock mechanism 202, thereby turning the lock mechanism 202 into a locking operation state or into a lock-releasing operation state. The lock cylinder 203 is constituted of a double action hydraulic cylinder.

Not only the bucket 11, other operation tools can be attached to the attachment device 201. The following attachments (spare attachments) are exemplified as the other operation tools; for example, a hydraulic crusher, a hydraulic breaker, an angle broom, an earth auger, a pallet fork, a sweeper, a mower, a snow blower, and the like.

A hydraulic pressure extraction member 322 is disposed on the front portion of the left boom 10. The hydraulic pressure extraction member 322 is a device for connecting an hydraulic actuator to a hydraulic hose disposed on the left boom 10, the hydraulic actuator being installed on the spare attachment. The hydraulic pressure extraction member 322 is connected to the hydraulic actuator of the spare attachment by another hydraulic hose. The hydraulic operation fluid is supplied to the hydraulic pressure extraction member 322 at first, and then passes through the hydraulic hose to be supplied to the hydraulic actuator.

The bucket cylinder 15 is arranged closer to the front portion of each of the booms 10. The bucket cylinder 15 is pivotally supported on the boom 10 by a first bucket cylinder pin 26 at an upper portion of the bucket cylinder 15, thereby being capable of freely turning about a horizontal axis of the first bucket cylinder pin 26. The bucket cylinder 15 is pivotally supported on the attachment body 23 by a second bucket cylinder pin 27 at a lower portion of the bucket cylinder 15, thereby being capable of freely turning about a horizontal axis of the second bucket cylinder pin 27. Stretching and shortening of the bucket cylinder 15 swing the bucket 11.

In the embodiment, both of the right travel device 5 and the left travel device 5 employ a wheeled travel device, the wheeled travel device having a front wheel 5F and a rear wheel 5R. However, a crawler travel device (including a semi-crawler travel device) may be employed as the travel device 5.

Figure 1:
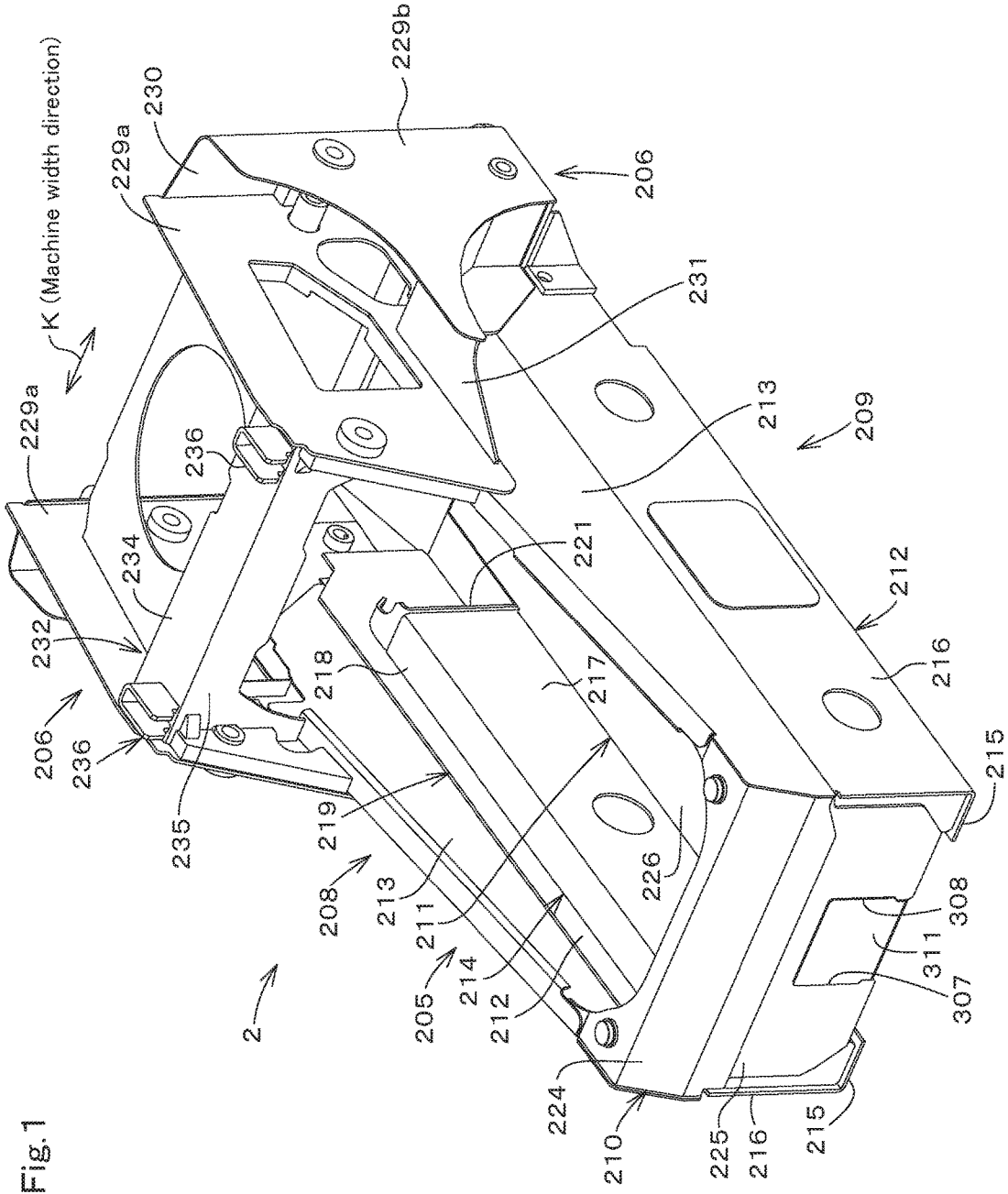
FIG. 1 is a schematic perspective view of a machine body according to an embodiment of the present invention, diagonally showing the front of the machine body.
Figure 2:
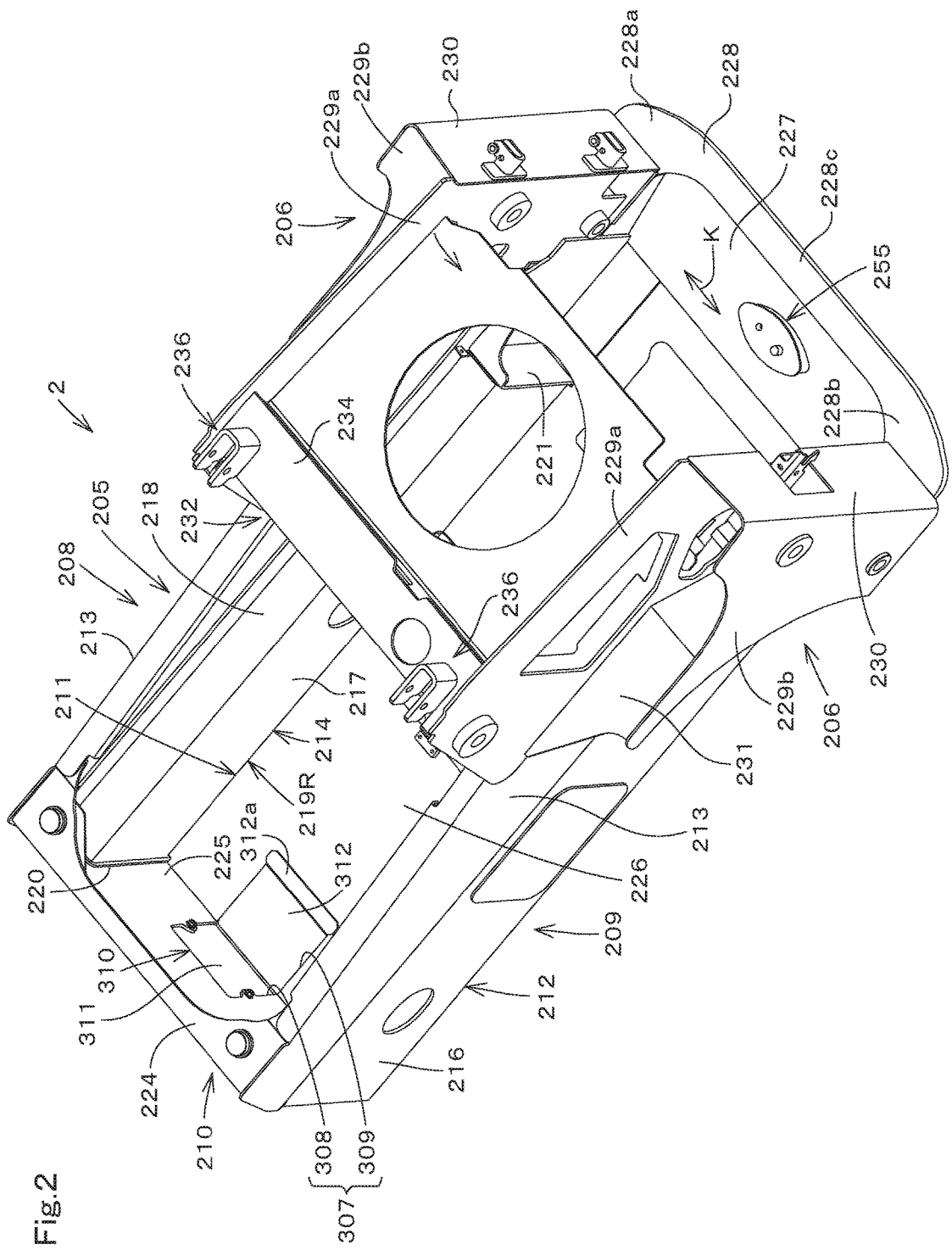
FIG. 2 is a schematic perspective view of the machine body according to the embodiment, diagonally showing the back of the machine body.

Next, a concrete configuration of the steer skid loader 1 will be described below. As shown in FIG. 1 and FIG. 2, the machine body 2 includes a main frame 205 and a support frame 206.

The main frame 205 includes a right frame portion 208, a left frame portion 209, a front frame portion 210, and a bottom frame portion 211. The right frame portion 208 constitutes a right portion of the machine body 2. The left frame portion 209 constitutes a left portion of the machine body 2. The front frame portion 210 constitutes a front portion of the machine body 2. The bottom frame portion 211 constitutes a bottom portion of the machine body 2.

Figure 3:
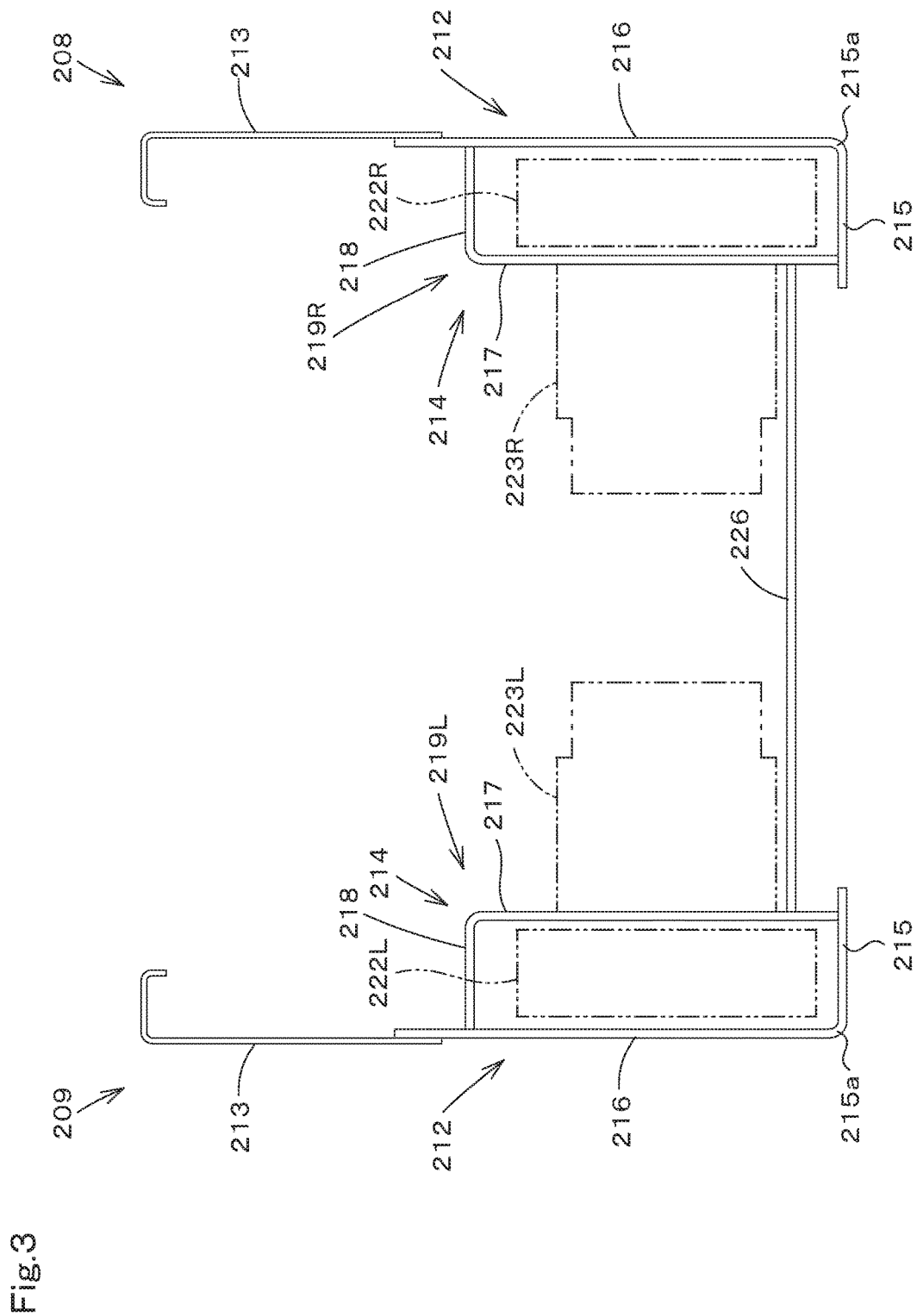
FIG. 3 is a back cross-sectional view of an intermediate portion of the machine body according to the embodiment, the intermediate portion being a portion intermediate in a front to rear direction (or a rear to front direction)

As shown in FIG. 3, the right frame portion 208 and the left frame portion 209 each include a side member 212, an upper plate member 213, and a cover 214.

The side member 212 includes a first plate member 215 and a second plate member 216. The second plate member 216 stands up from the first plate member 215. In particular, the second plate member 216 extends upward from an end portion 215a of the first plate member 215, the end portion 215a being disposed on an outer side of the first plate member 215 (on an outer side of the machine body 2). In the embodiment, the first plate member 215 and the second plate member 216 are integrally formed by bending a single plate.

The upper plate member 213 is positioned above the side member 212. The upper plate member 213 is placed on an upper portion of the second plate member 216 of the side member 212 at a lower portion of the upper plate member 213, and is attached and fixed by bolts.

The cover 214 is arranged on an inner side of the side member 212 of the machine body 2 (on an inner side of the machine body 2). In other words, the cover 214 is arranged on a side of the side member 212, the side being opposite to the travel device 5. The cover 214 includes a third plate member 217 and a fourth plate member 218. The third plate member 217 is disposed to be opposite to the second plate member 216. The fourth plate member 218 is placed above the first plate member 215 and is opposite to the first plate member 215.

The fourth plate member 218 extends from an upper end of the third plate member 217 toward the second plate member 216. The third plate member 217 is connected to the first plate member 215 at a lower end of the third plate member 217. The fourth plate member 218 is connected to the second plate member 216 at an end portion of the fourth plate member 218. In the embodiment, the third plate member 217 and the fourth plate member 218 are integrally formed by bending a single plate.

Transmission cases 219R and 219L are constituted of the side member 212 and the cover 214. That is, the side member 212 and the cover 214 form a pair of the transmission cases 219R and 219L, the transmission case 219R being disposed on a right portion of the machine body 2, the transmission case 219L being disposed on a left portion of the machine body 2.

Figure 4:
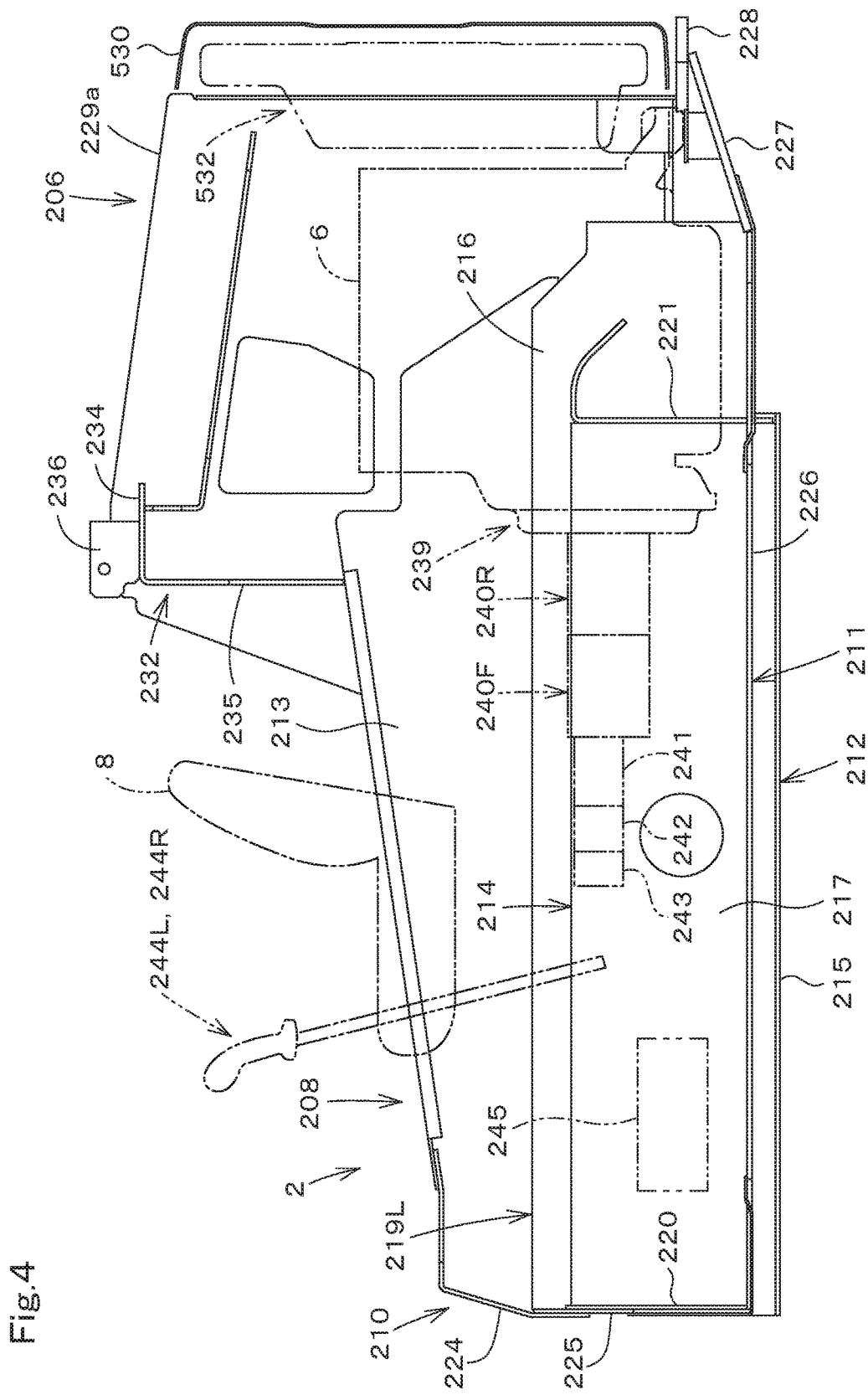
FIG. 4 is a side view of the machine body according to the embodiment.

As shown in FIG. 4, front ends of the transmission cases 219R and 219L are closed by a front cover plate 220, and rear ends of the transmission cases 219R and 219L are closed by a rear cover plate 221.

As shown in FIG. 3, a motive power transmission device 222R is housed in the transmission case 219R, and a motive power transmission device 222L is housed in the transmission case 219L. The motive power transmission devices 222R and 222L transmit the motive power to the front wheels 5F and the rear wheels 5R of the travel devices 5.

A travel motor 223R is attached to the third plate member 217 of the cover 214 disposed on the right side, and a travel motor 223L is attached to the third plate member 217 of the cover 214 disposed on the left side. The travel motors 223R and 223L are hydraulic motors, the travel motors 223R and 223L each constituting a part of a hydrostatic continuously variable transmission (also referred to as an HST). The travel motor 223R disposed on the right side dives the front wheel 5F and the rear wheel 5R of the right travel device 5 through the motive power transmission device 222R disposed on the right side. The travel motor 223L disposed on the left side dives the front wheel 5F and the rear wheel 5R of the left travel device 5 through the motive power transmission device 222L disposed on the left side.

As shown in FIG. 1 and FIG. 2, The front frame portion 210 joints the right frame portion 208 and the left frame portion 209 to each other at front ends of the right frame portion 208 and the left frame portion 209. The front frame portion 210 includes an upper plate 224 and a lower plate 225. The upper plate 224 mainly joints the upper plate members 213. The lower plate 225 mainly joints the side members 212.

The bottom frame portion 211 includes a main plate 226, a rear plate 227, and a bumper member 228 (a bumper portion). The main plate 226 is disposed from the front end of the machine body 2 to the rear portion of the machine body 2. The rear plate 227 is placed behind the main plate 226 between the support frame 206 disposed on the right side and the support frame 206 disposed on the left side. The rear plate 227 extends from a lower position of a rear portion of the engine 6 toward a backward direction of the engine 6. In addition, the rear plate 227 is disposed being backwardly lifted up to be tilted.

The bumper member 228 is constituted of a piece of plate member, and is placed on a rear end portion of the machine body 2. The bumper member 228 joints rear portions of the support frames 206 to each other. A right side 228a of the bumper member 228 protrudes backward from the support frame 206 disposed on the right side. A left side 228b of the bumper member 228 protrudes backward from the support frame 206 disposed on the left side. A joint portion 228c is formed between the right side 228a of the bumper member 228 and the left side 228b of the bumper member 228, the joint portion 228c being formed to be approximately linear along the machine width direction K. A connecting portion between the joint portion 228c and the right side 228a is curved. A connecting portion between the joint portion 228c and the left side 228b is curved. The joint portion 228c is placed on a rear end of the rear plate 227 and fixed to the rear end.

As shown in FIG. 1 and FIG. 2, one of the support frames 206 is disposed on a right side of a rear portion of the main frame 205, and the other one of the support frames 206 is disposed on a left side of the rear portion of the main frame 205.

Each of the support frames 206 includes: a pair of a support wall 229a and a support wall 229b; and a rear wall 230. One of the support walls, the support wall 229a, is separated from the other one of the support walls, the support wall 229b, in the machine width direction K. The support wall 229a and the support wall 229b are disposed to be opposite to each other. Of the pair of support walls 229a and 229b, the support wall 229a (also referred to as the inner support wall 229a) is fixed to the upper plate member 213. The support wall 229b (also referred to as the outer support wall 229b) is placed outside the inner support wall 229a.

The rear wall 230 is jointed to a rear end of the support wall 229a and to a rear end of the support wall 229b, thereby jointing the support wall 229a and the support wall 229b to each other. A fender 231 is disposed between the pair of support walls 229a and 229b, the fender 231 being configured to cover the rear wheel 5R at a back and upper side of the rear wheel 5R A joint frame 232 is disposed between the support frames 206. The joint frame 232 joints front portions of the inner support walls 229a to each other. The joint frame 232 includes an upper plate member 234 and a front plate member 235. The front plate member 235 extends downward from a front end of the upper plate member 234.

Figure 25:
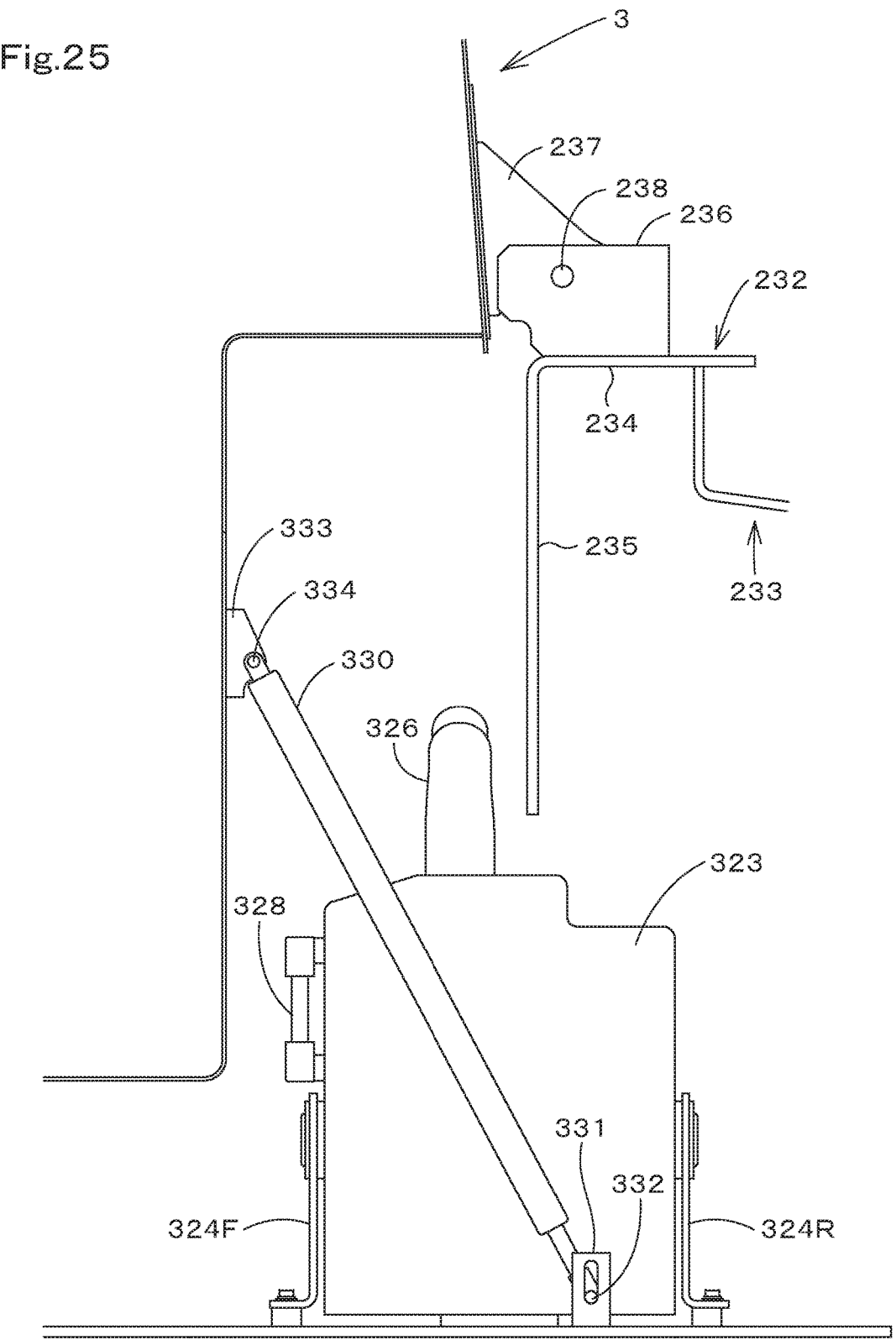
FIG. 25 is a right side view showing arrangement of the hydraulic operation fluid tank and a gas spring according to the embodiment.

As shown in FIG. 1, the upper plate member 234 is provided with a pair of machine body brackets 236. As shown in FIG. 25, a cabin bracket 237 is pivotally supported by a pivot shaft 238 on the machine body bracket 236. The cabin bracket 237 is a bracket disposed on a rear portion of the cabin 3. Accordingly, the cabin 3 is capable of freely swing upward and downward about the pivot shaft 238.

As shown in FIG. 4, a pump housing 239 is disposed on a front portion of the engine 6. A pair of travel pumps 240F and 240R are disposed on the pump housing 239, arranging the travel pumps 240F and 240R in parallel along the front to rear direction (or the rear to front direction). A first pump 241, a second pump 242, and a third pump 243 are disposed in front of the travel pump 240F arranged on the front side, being arranged in parallel along the front to rear direction (or the rear to front direction). The engine 6 drives the pumps, that is, the travel pump 240F, the travel pump 240R, the first pump 241, the second pump 242, and the third pump 243.

The travel pumps 240F and 240R are each constituted of a hydraulic pump of a variable displacement type, the travel pumps 240F and 240R constituting a part of the hydrostatic continuously variable transmission (also referred to as an HST) including the travel motors 223R and 223L. The travel pump 240F arranged on the front side drives the travel motor 223L disposed on the left side, and the travel pump 240R arranged on the rear side drives the travel motor 223R disposed on the right side.

The first pump 241, the second pump 242, and the third pump 243 are each constituted on a gear pump of a constant displacement type. The first pump 241 drives hydraulic actuators and hydraulic attachments, the hydraulic actuators being installed in the operation device 4, the hydraulic attachments being attached to the operation device 4. The second pump 242 is used for increasing the flow rate of the hydraulic operation fluid. The third pump 243 is mainly used for supply of a control signal pressure.

A travel lever (an operation lever) 244R is disposed on a right side of a front portion of the operator seat 8. A travel lever (an operation lever) 244L is disposed on a left side of the front portion of the operator seat 8. The travel lever 244R is a lever used for operation of the travel pump 240R. The travel lever 244L is a lever used for operation of the travel pump 240F. The right travel device 5 is operated by operating the travel pump 240R. The left travel device 5 is operated by operating the travel pump 240L. The travel lever 244L disposed on the left side operates the travel pump 240F disposed on the front side. The travel lever 244R disposed on the right side operates the travel pump 240R disposed on the rear side.

A control valve 245 (referred to as an operation control valve) for the operation device 4 is arranged below the operator seat 8 in front of the operator seat 8. The operation control valve 245 incorporates a boom control valve, a bucket control valve (an operation tool control valve), and an attachment control valve in a valve body. The boom control valve is a valve for controlling the boom cylinder 14. The bucket control valve is a valve for controlling the bucket cylinder 15. The attachment control valve is a valve for controlling a hydraulic actuator installed in an attachment tool, the attachment tool being attached instead of the bucket 11.

A bonnet (an engine hood) 530 is disposed in rear of the engine 6. The bonnet 530 is attached to a support frame 206 by hinges at one end side of the bonnet 530, and thereby being capable of being opened and closed. A rear end of the bumper member 228 protrudes more backward than the bonnet 530. A fuel tank 532 is disposed between the engine 6 and the bonnet 530. The fuel tank 532 is attached on the bonnet 530.

Figure 5:
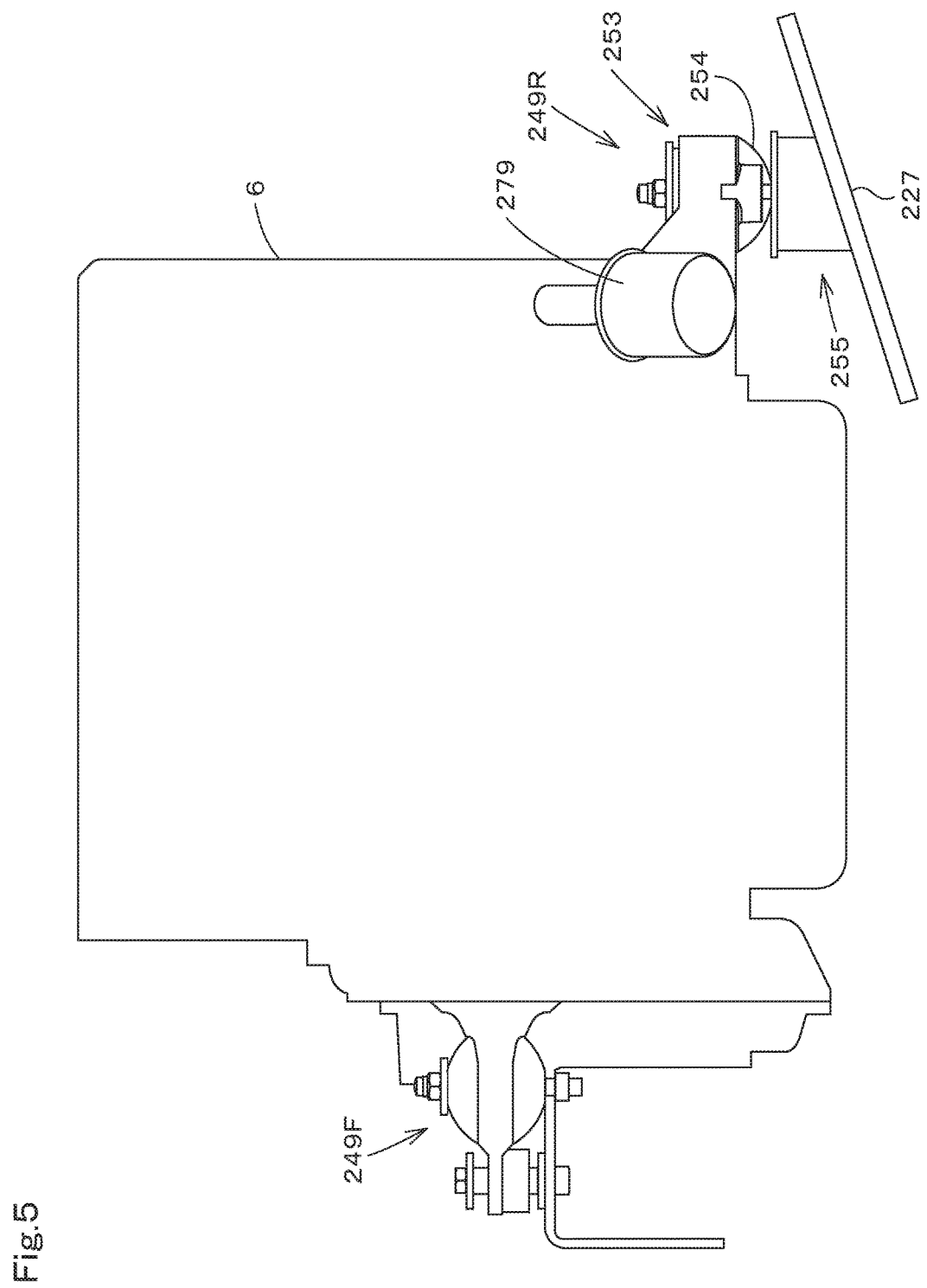
FIG. 5 is a side view of an engine according to the embodiment.

As shown in FIG. 5, a mount member 249F is disposed on a front side of the engine 6. A mount member 249R is disposed on a rear side of the engine 6. The mount member 249F and the mount member 249R are configured to support the engine. A pair of the mount members 249F disposed on the front side support the front side of the engine 6. Single mount member 249R disposed on the rear side supports the rear side of the engine 6.

Figure 6:
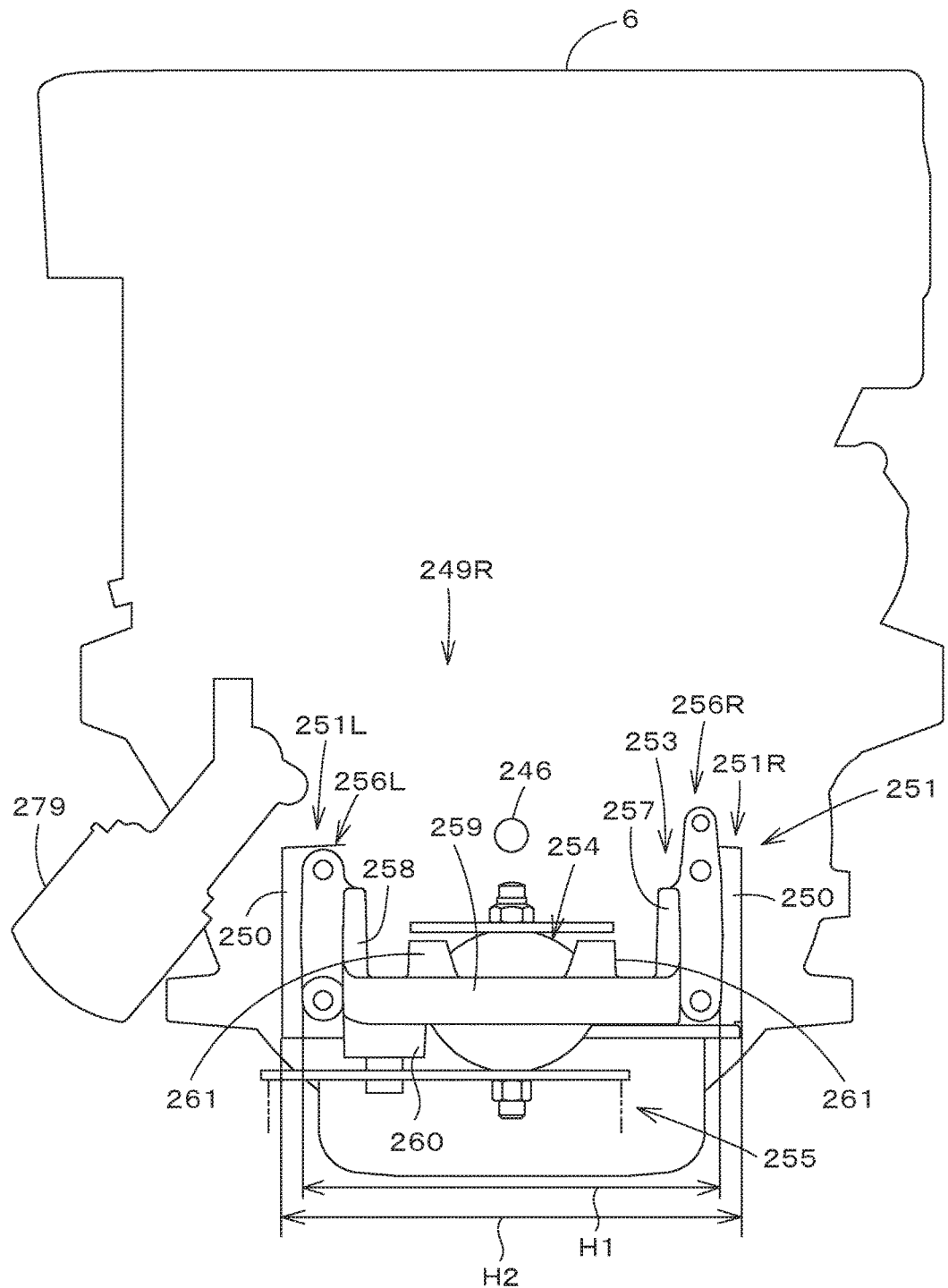
FIG. 6 is a back view of the engine according to the embodiment.

As shown in FIG. 6, an output shaft 246 protrudes from a lower portion of a rear portion (a back surface) of the engine 6. That is, the output shaft 246 protrudes from the rear portion (the back surface), the rear portion (the back surface) being on a side opposite to a front surface of the engine 6. The output shaft 246 drives a compressor and an alternator.

In addition, a rear attachment portion 251 including an attachment surface 250 is disposed under a rear end portion of the output shaft 264, the attachment surface 250 facing backward. The rear attachment portion 251 includes a first attachment portion 251R and a second attachment portion 251L, the first attachment portion 251R being disposed on the right side, the second attachment portion 251L being disposed on the left side.

Figure 8:
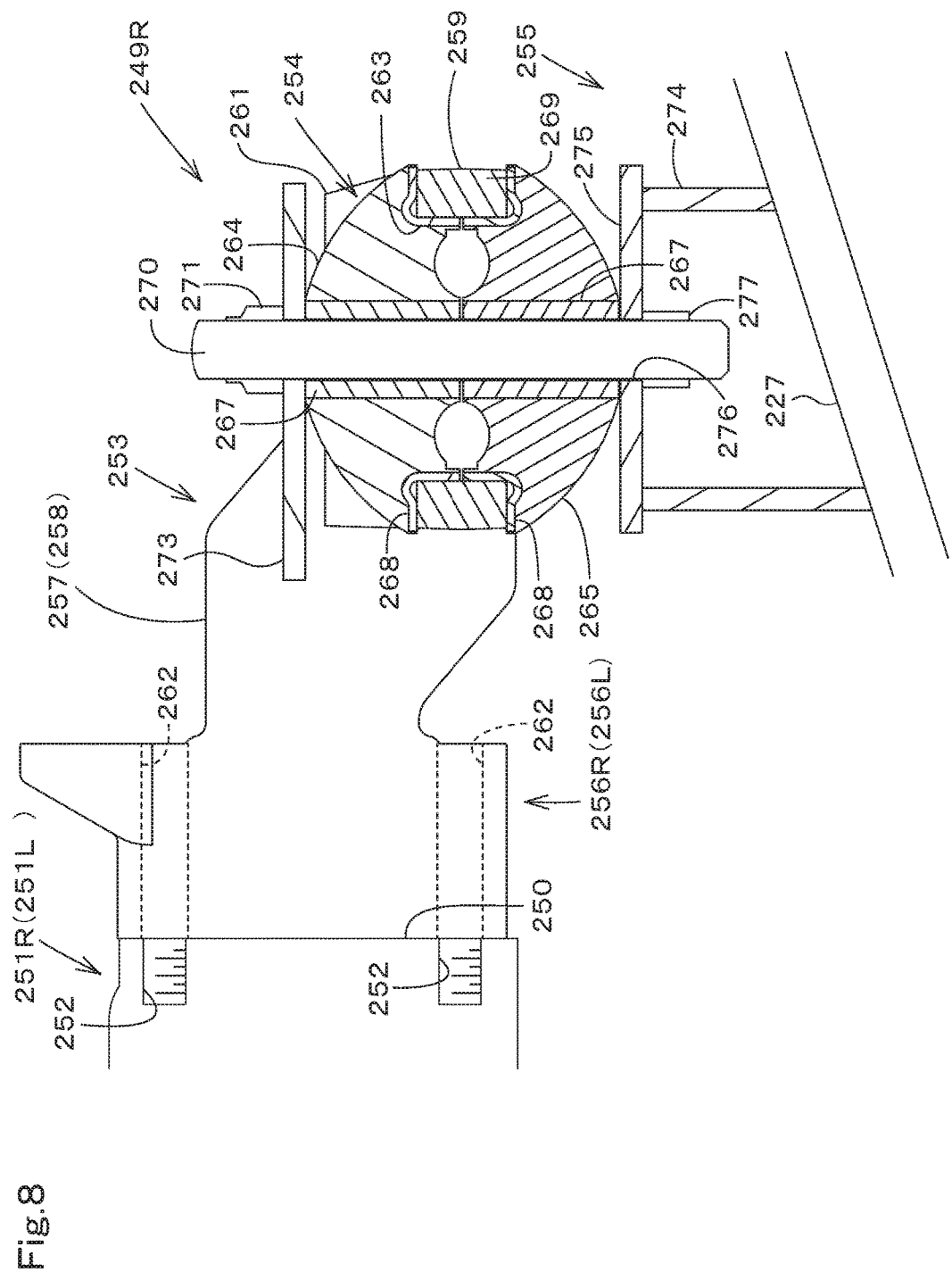
FIG. 8 is a side cross-sectional view of the mount member according to the embodiment.

As shown in FIG. 8, a screw hole 252 is formed on the attachment surface 250 of the first attachment portion 251R, and another screw hole 252 is formed on the attachment surface 250 of the second attachment portion 251L. The first attachment portion 251R and the second attachment portion 251L are formed integrally on the crankcase of the engine 6 by the casting.

Figure 9:
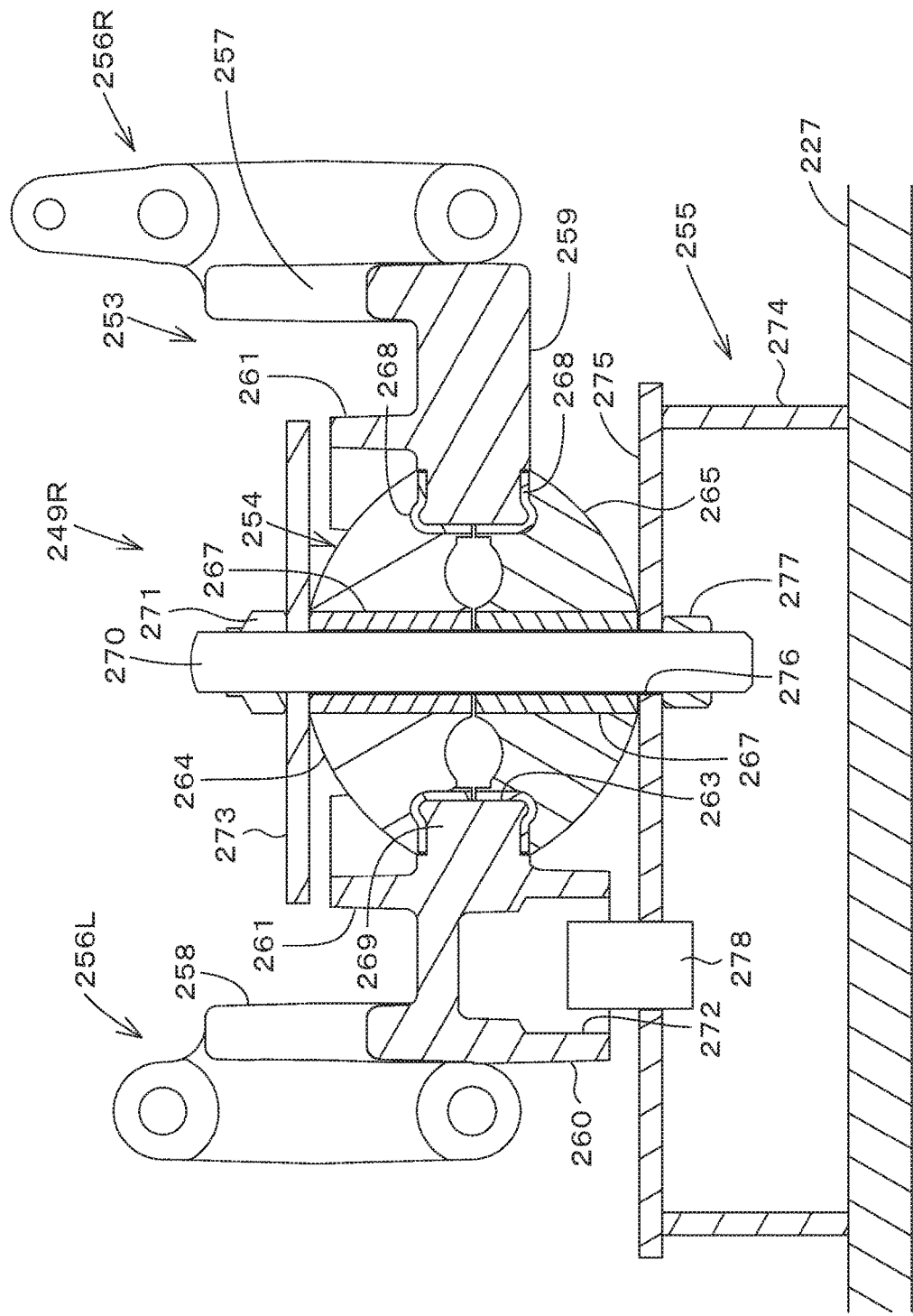
FIG. 9 is a back view of the mount member according to the embodiment.

As shown in FIG. 8 and FIG. 9, the mount member 249R disposed on the rear side includes a first support member 253, an elastic member 254, and a second support member 255. The first support member 253 is attached to the first attachment portion 251R and to the second attachment portion 251L. The elastic member 254 is attached to the first support member 253. The second support member 255 supports the elastic member 254.

Figure 7:
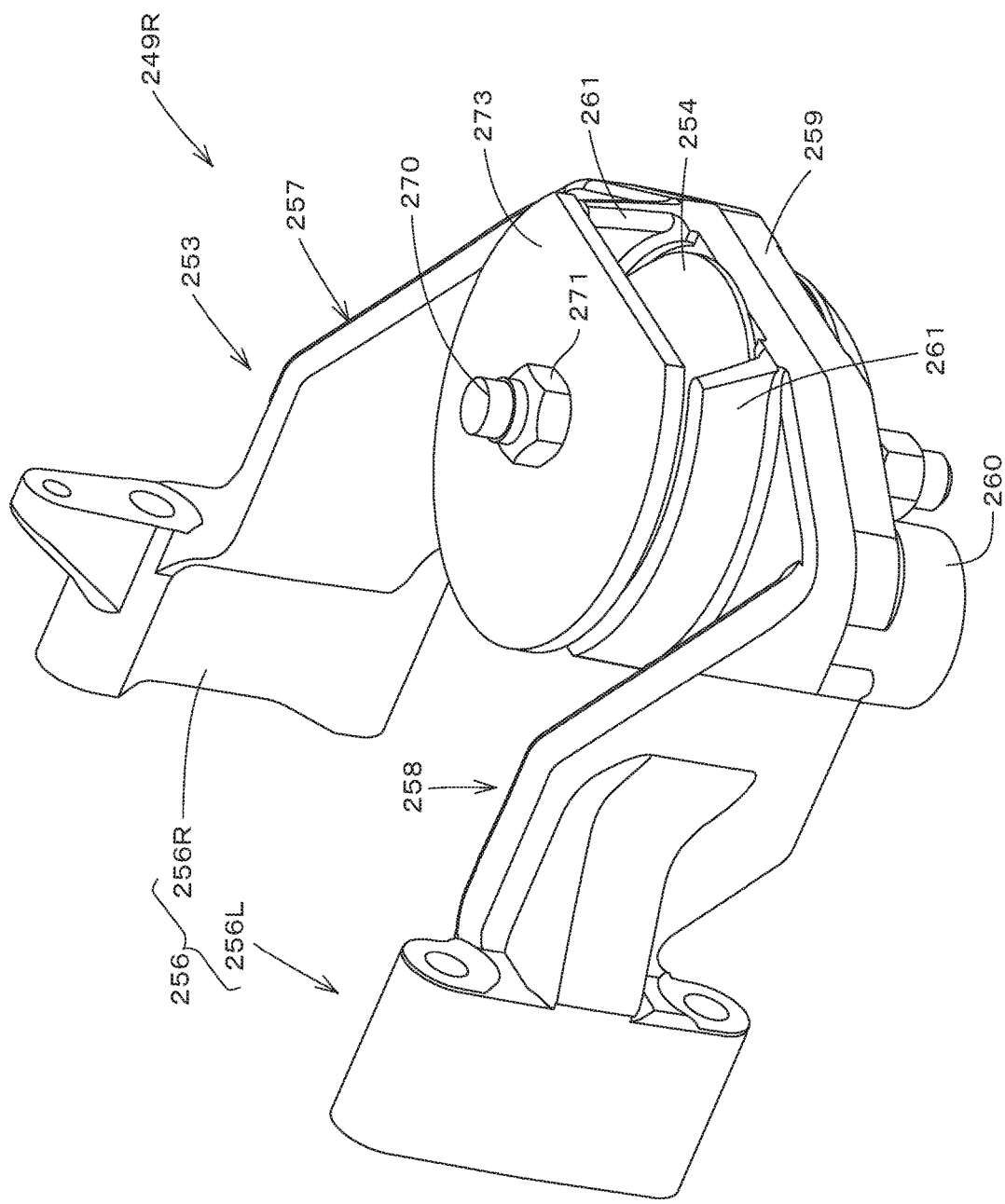
FIG. 7 is a schematic perspective view of a mount member according to the embodiment.

As shown in FIG. 7, FIG. 8, and FIG. 9, the first support member 253 includes an opposite attachment portion 256, a first arm portion 257, a second arm portion 258, a joint portion 259, a first protruding portion 260, and a second protruding portion 261.

The opposite attachment portion 256 includes: a third attachment portion 256R disposed on the right side; and a fourth attachment portion 256L disposed on the left side. The third attachment portion 256R is attached to be opposed to the first attachment portion 251R. The fourth attachment portion 256L is attached to be opposed to the second attachment portion 251L.

As shown in FIG. 8, bolt insertion holes 262 are formed in the third attachment portion 256R, the bolt insertion holes 262 penetrating through in the front to rear direction (or the rear to front direction). Other bolt insertion holes 262 are formed in the fourth attachment portion 256L, the bolt insertion holes 262 penetrating through in the front to rear direction (or the rear to front direction). Bolts are inserted through the bolt insertion holes 262 of the third attachment portion 256R from behind the engine 6, and bolts are inserted through the bolt insertion holes 262 of the fourth attachment portion 256L from behind the engine 6. Then, the bolts are screwed into the screw holes 252 of the first attachment portion 251R and the second attachment portion 251L, thereby attaching the first support member 253 (the third attachment portion 256R and the fourth attachment portion 256L) to the first attachment portion 251R and the second attachment portion 251L.

The first arm portion 257 extends backward (about rightly-backward) from the third attachment portion 256R. The second arm portion 258 extends backward (about rightly-backward) from the fourth attachment portion 256L.

The joint portion 259 joints the first arm portion 257 to the second arm portion 258 between the arm portions. The elastic member 254 is attached to the joint portion 259. An attachment hole 263 is formed in the joint portion 259, the attachment hole 263 being used for attachment of the elastic member 254.

The elastic member 254 is formed of rubber (or a rubbery elastic member other than rubber). The elastic member 254 is divided into a hemispheric upper portion and a hemispheric lower portion, the hemispheric upper portion being referred to as a upper vibration-proof member 264, the hemispheric lower portion being referred to as a lower vibration-proof member 265. A cylindrical member 267 vertically penetrates the upper vibration-proof member 264 to be fixed to the upper vibration-proof member 264, and another cylindrical member 267 vertically penetrates the lower vibration-proof member 265 to be fixed to the lower vibration-proof member 265. A ring member 268 is fixed to a circumferential portion on a lower side of the upper vibration-proof member 264, and another ring member 268 is fixed to a circumferential portion on an upper side of the lower vibration-proof member 265.

The ring member 268 of the upper vibration-proof member 264 is fitted into the attachment hole 263 from above. The ring member 268 of the lower vibration-proof member 265 is fitted into the attachment hole 263 from below. A wall portion 269 disposed around the attachment hole 263 is sandwiched by: the ring member 268 of the upper vibration-proof member 264; and the ring member 268 of the lower vibration-proof member 265.

A presser plate 273 (a restriction member) is disposed on the upper vibration-proof member 264. A stud bolt 270 is inserted into both of the cylindrical member 267 disposed above and the cylindrical member 267 disposed below, penetrating through the presser plate 273. A nut 271 is screwed to an upper end portion of the stud bolt 270.

The first protruding portion 260 protrudes downward from a lower surface of the joint portion 259. The first protruding portion 260 is formed extending downward to have a cylindrical shape, the cylindrical shape having an opening bottom end. An inside of the first protruding portion 260 serves as an insertion hole 272 formed by a circular rim.

The second protruding portion 261 protrudes upward from the joint portion 259. The second protruding portion 261 is disposed on both sides of the attachment hole 263, being formed along a rim portion of the attachment hole 263. In addition, the second protruding portion 261 is placed under the presser plate 273.

The second support member 255 is placed below the joint portion 259. The second support member 255 includes a cylindrical member 274 and a fixation member 275.

The cylindrical member 274 is fixed to an upper surface of the rear plate 227 of the bottom frame portion 211 included in the machine body 2. The cylindrical member 274 has an elliptic cylinder shape, the elliptic cylinder shape being horizontally long in a plan view.

The fixation member 275 is constituted of a plate member formed to be elliptical in the plan view. The fixation member 275 closes an opening formed at an upper end of the cylindrical member 274. In addition, the fixation member 275 is fixed to the upper end of the cylindrical member 274. Furthermore, the elastic member 254 is placed on an upper surface of the fixation member 275, and thereby the engine 6 is elastically supported. That is, the elastic member 254 suppresses vibration of the engine 6.

The fixation member 275 has a circular rim forming an insertion hole 276. The stud bolt 270 is inserted into the insertion hole 276. A nut 277 is securely fixed to a lower surface of the fixation member 275, specifically to a portion corresponding to the insertion hole 276. A lower end portion of the stud bolt 270 is inserted into the insertion hole 276, and a lower end of the stud bolt 270 is screwed to the nut 277. The elastic member 254 is attached to the second support member 255 by screwing up the nut 271, the nut 271 being screwed to the upper end portion of the stud bolt 270.

A protruding member 278 is disposed on the fixation member 275, the protruding member 278 protruding upward. The protruding member 278 is constituted of a cylindrical short rod. The protruding member 278 is inserted into the insertion hole 272 of the first protruding portion 260.

The first protruding portion 260 and the second protruding portion 261 serve as a stopper for restricting a deformation amount of the elastic member 254. In particular, the first protruding portion 260 contacts to the second support member 255, and the second protruding portion 261 contacts to the presser plate 273, thereby the deformation amount of the elastic member 254 is restricted.

In addition, the protruding member 278 contacts to the circular rim (the inner surface) of the insertion hole 272 of the first protruding portion 260, thereby restricting a horizontal deformation amount of the elastic member 254.

In the above-described mount member 249R, the rear attachment portion 251 facing backward is disposed on the rear portion of the engine 6, and the first support member 253 of the mount member 249R includes the opposite attachment portion 256, the opposite attachment portion 256 being attached opposite to the rear attachment portion 251. In this manner, the first support member 253 of the mount member 249R is attached to the rear attachment portion 251 of the rear portion of the engine 6 from behind, and accordingly a space is not required on a right side of and on a left side of the rear portion of the engine 6, the space being used for attachment of the first support member 253, thereby the mount member 249R allows the good layout of and the easy maintenance of parts disposed around the rear portion of the engine 6.

In addition, the first support member 253 is compactly formed by integrally forming, by the casting, the opposite attachment portion 256, the first arm portion 257, the second arm portion 258, the joint portion 259, the first protruding portion 260, and the second protruding portion 261.

Moreover, as shown in FIG. 6, a width H1 of the first support member 253 is equal to or less than an interval H2 between: an outer side surface of the first attachment portion 251R; and an outer side surface of the second attachment portion 251L. In this manner, the first support member 253 does not protrude in the width direction from the rear attachment portion 251. Accordingly, the first support member 253 allows the good layout of and the easy maintenance of parts disposed around the rear portion of the engine 6. For example, an engine oil filter 279 can be disposed on a left side of the rear portion of the engine 6, thereby the first support member 253 improves the easy maintenance of the engine oil filter 279. In addition, the first support member 253 is formed by the casting, thereby a structure of the first support member 253 is simplified.

Moreover, the first protruding portion 260 and the second protruding portion 261 serve as stoppers for restricting a deformation amount of the elastic member 254. And, the first protruding portion 260 and the second protruding portion 261 are integrally formed as the first support member 253 by the casting, and thereby the number of parts is reduced.

Figure 10:
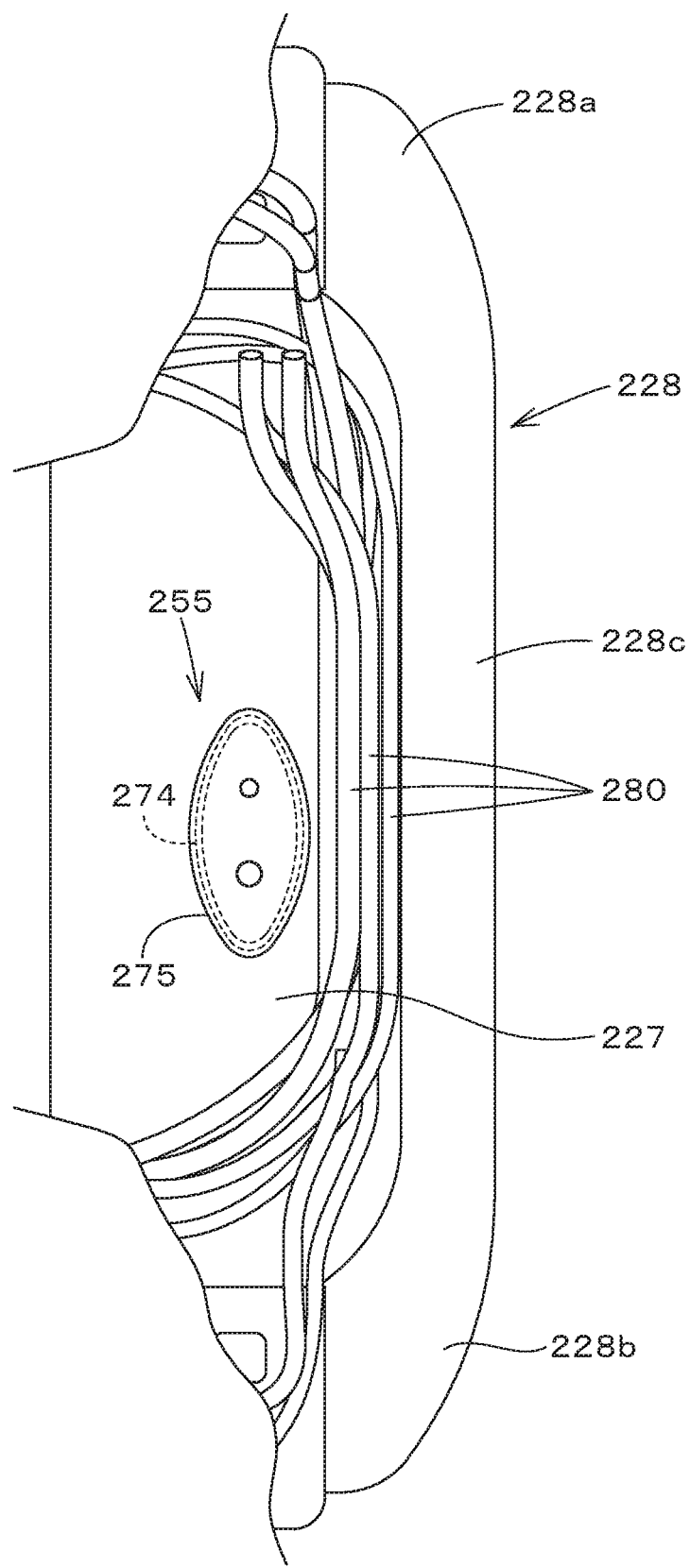
FIG. 10 is a plan view of a portion behind the engine according to the embodiment.

As shown in FIG. 10, hydraulic hoses 280 are disposed between the second support member 255 and the bumper member 228, the hydraulic hose 280 running across the machine body 2. The hydraulic hoses 280 running across the machine body 2 are arranged being centralized on the bottom portion of the machine body 2 behind the engine 6, thereby being prevented from interrupting the check and maintenance of the inside of the machine body 2. In addition, since the hydraulic hoses 280 are intended to be arranged being centralized on the bottom portion of the machine body 2 behind the engine 6, the hydraulic hoses 280 can be easily arranged only by opening the bonnet 530. Furthermore, since the hydraulic hoses 280 are intended to be arranged being centralized on the bottom portion of the machine body 2 behind the engine 6, the hydraulic hoses 280 can be easily installed in the manufacturing. Moreover, since the hydraulic hoses 280 are intended to be arranged on the bottom portion of the machine body 2 behind the engine 6, the hydraulic hoses 280 can be arranged at a large bend radius. In this manner, the hydraulic hoses 280 are prevented from degradation such as the wearing degradation caused by hydraulic pulsation.

The cylindrical member 274 of the second support member 255 has an elliptic cylinder shape in the plan view, and thereby the cylindrical member 274 serves as a hose guide for the hydraulic hoses 280. In addition, a connecting portion between the joint portion 228c and the right side 228a is curved, a connecting portion between the joint portion 228c and the left side 228b is curved, and thereby the bumper 228 also serves as a hose guide for the hydraulic hoses 280. Furthermore, the hose guides are integrated into the second support member 255 and the bumper member 228 by using the second support member 255 and the bumper member 228 as the guide members for the hydraulic hoses 280.

Figure 11:
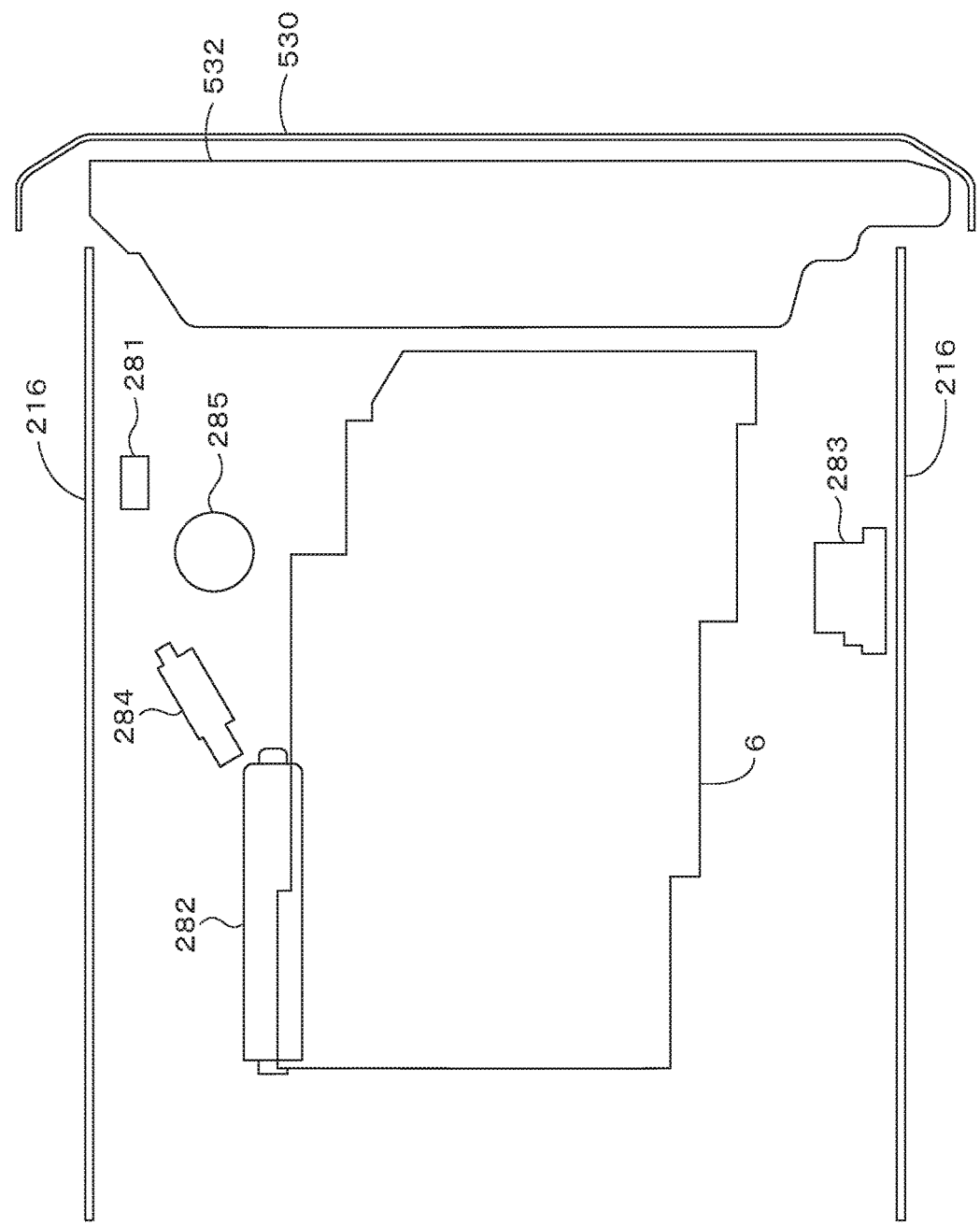
FIG. 11 is a schematic plan view of a portion around the engine according to the embodiment.

As shown in FIG. 11, a ride control valve 281, an accumulator 282, a valve 283 for controlling a level of the bucket (referred to as a bucket level control valve 283), a quick hitch valve 284, and an oil filter 285 are disposed on the right and left sides of the engine 6 in front of the bonnet 530.

The ride control valve 281 is a valve for reducing the pitching and bounding of the machine body 2, the pitching and bounding being caused when the steer skid loader 1 runs uneven ground in conveyance of gravel, crushed stones, and the like. The ride control valve 281 is controlled to be opened and to be closed to make the accumulator 282 absorb fluctuation of a bottom pressure of the boom cylinder 14. The bucket level control valve 283 controls the bucket cylinder 15 to keep a level of the bucket 11 approximately constant, thereby preventing the gravel, crushed stones, and the like in the bucket 11 from falling from the bucket 11 even when the booms 10 swing upward and downward.

As shown in FIG. 30, the quick hitch valve 284 is a valve for controlling the lock cylinder 203 of the attachment device 201. The oil filter 285 is a filter for removing contamination, the contamination being present in a hydraulic pilot fluid discharged from the third pump 243. The oil filter 285 is periodically replaced by another oil filter 285.

The ride control valve 281, the accumulator 282, the bucket level control valve 283, the quick hitch valve 284, and the oil filter 285 can be easily accessed when the bonnet 530 is opened, thereby allowing the easy maintenance.

In addition, the ride control valve 281, the bucket level control valve 283, and the quick hitch valve 284 may be installed later as optional parts to the steer skid loader 1, depending on a type of the steer skid loader 1. For this reason, the installation positions of the ride control valve 281, the bucket level control valve 283, and the quick hitch valve 284 are prepared on the rear portion of the machine body 2, the rear portion being easily accessed when the bonnet 530 is opened, and thereby the ride control valve 281, the bucket level control valve 283, and the quick hitch valve 284 can be easily installed later.

Figure 12:
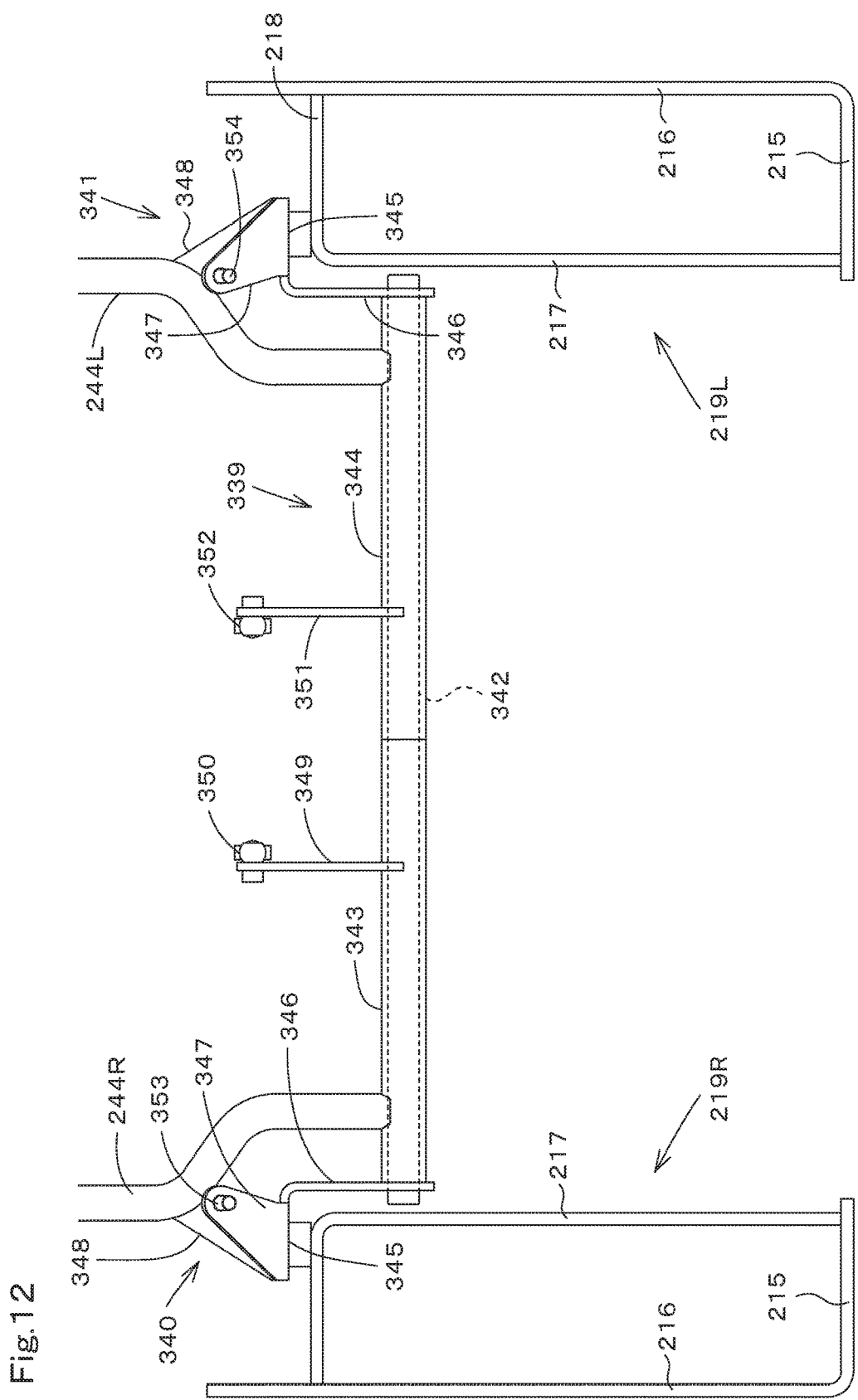
FIG. 12 is a front view of a lever support member according to the embodiment.
Figure 13:
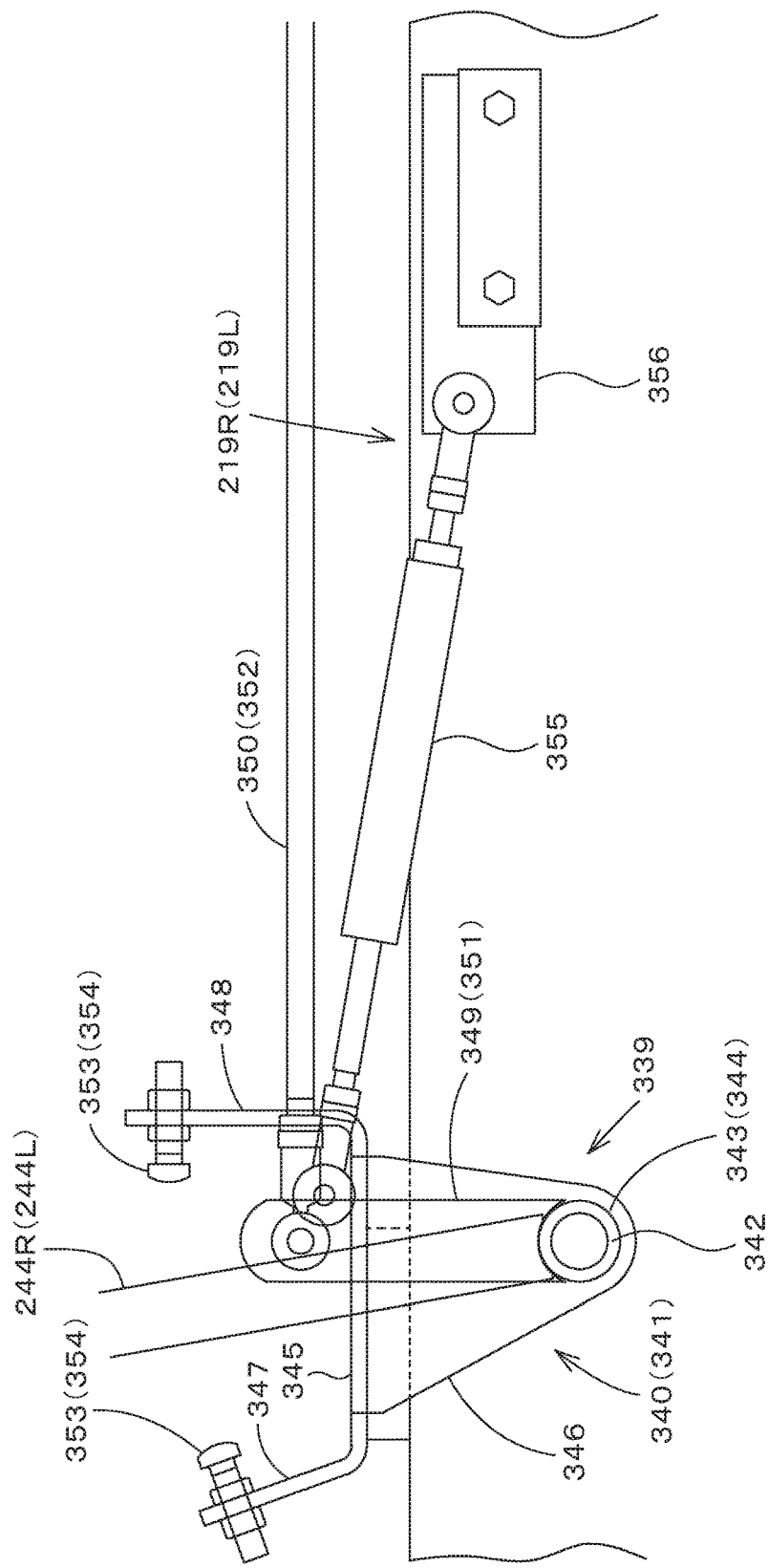
FIG. 13 is a side view of the lever support member according to the embodiment.

As shown in FIG. 12 and FIG. 13, the travel levers 244R and 244L are supported by a lever support member 339. The lever support member 339 is disposed extending between: the transmission case 219R disposed on the right side; and the transmission case 219L disposed on the left side (from the transmission case 219R to the transmission case 219L).

The lever support member 339 includes a first attachment member 340, a second attachment member 341, a joint member 342, a first support cylinder 343, and a second support cylinder 344.

The first attachment member 340 is attached to the transmission case 219R disposed on the right side. The second attachment member 341 is attached to the transmission case 219L disposed on the left side.

The first attachment member 340 and the second attachment member 341 each include an attachment wall 345, an extending wall 346, a front wall 347, and a rear wall 348.

The attachment wall 345 of the first attachment member 340 is attached to an upper surface of the fourth plate member 218 of the transmission case 219R. The attachment wall 345 of the second attachment member 341 is attached to an upper surface of the fourth plate member 218 of the transmission case 219L.

The extending wall 346 of the first attachment member 340 extends downward from the attachment wall 345 of the first attachment member 340 along the third plate member 217 of the transmission case 219R. The extending wall 346 of the second attachment portion 341 extends downward from the attachment wall 345 of the second attachment member 341 along the third plate member 217 of the transmission case 219L.

The front wall 347 of the first attachment member 340 extends upward from a front end of the attachment wall 345 of the first attachment member 340. The front wall 347 of the second attachment member 341 extends upward from a front end of the attachment wall 345 of the second attachment member 341.

The rear wall 348 of the first attachment member 340 extends upward from a rear end of the attachment wall 345 of the first attachment member 340. The rear wall 348 of the second attachment member 341 extends upward from a rear end of the attachment wall 345 of the second attachment member 341

The joint member 342 is constituted of a cylindrical short rod. The joint member 342 joints the extending wall 346 of the first attachment member 340 to the extending wall 346 of the second attachment member 341 (between the extending walls 346).

The first support cylinder 343 is fitted into a right portion of the joint member 342, and the first support cylinder 343 is capable of freely turning about an axis of the first support cylinder 343 on the right portion. The second support cylinder 344 is fitted into a left portion of the joint member 342, and the second support cylinder 344 is capable of freely turning about an axis of the second support cylinder 344 on the left portion.

The first support cylinder 343 is fixed to a lower end side of the travel lever 244R disposed on the right side, thereby supporting the travel lever 244R. In this manner, the travel lever 244R disposed on the right side is capable of swinging forward and backward by turning together with the first support cylinder 343. The second support cylinder 344 is fixed to a lower end side of the travel lever 244L disposed on the left side, thereby supporting the travel lever 244L. In this manner, the travel lever 244L disposed on the left side is capable of swinging forward and backward by turning together with the second support cylinder 343.

A first arm 349 is fixed to the first support cylinder 343. The first arm 349 is pivotally supported on a front end side of a first interlocking link 350. A rear end side of the first interlocking link 350 is jointed to an operation device not shown in the drawings, the operation device being configured to operate a swash plate of the travel pump 240R disposed on the rear side. The travel lever 244R disposed on the right side can be swung, thereby operating the swash plate of the travel pump 240R.

A second arm 351 is fixed to the second support cylinder 344. The second arm 351 is pivotally supported on a front end side of a second interlocking link 352. A rear end side of the second interlocking link 352 is jointed to an operation device not shown in the drawings, the operation device being configured to operate a swash plate of the travel pump 240L disposed on the front side. The travel lever 244L disposed on the left side can be swung, thereby operating the swash plate of the travel pump 240F.

Lower portions of the travel levers 244R and 244L are curved. The lower portion of the travel lever 244R disposed on the right side is placed between the front wall 347 and the rear wall 348 both included in the first attachment member 340. The lower portion of the travel lever 244L disposed on the left side is placed between the front wall 347 and the rear wall 348 both included in the second attachment member 341.

A right stopper 353 is attached to the front wall 347 of the first attachment member 340. Another right stopper 353 is attached to the rear wall 348 of the first attachment member 340. The travel lever 244R disposed on the right side contacts to the right stoppers 353, and thereby the right stoppers 353 restricting a distance of the swinging of the travel lever 244R disposed on the right side.

A left stopper 354 is attached to the front wall 347 of the second attachment member 341. Another left stopper 353 is attached to the rear wall 348 of the second attachment member 341. The travel lever 244L disposed on the left side contacts to the left stoppers 354, and thereby the left stoppers 354 restricting a distance of the swinging of the travel lever 244L disposed on the left side.

In addition, a lower portion of the travel lever 244R is pivotally supported by a front end portion of a dumper 355, and a lower portion of the travel lever 244L is pivotally supported by a front end portion of another dumper 355. A rear end portion of the dumper 355 disposed on the right side is pivotally supported by a stay 356 disposed on a side of the machine body 2 (the transmission case 219R). A rear end portion of the another dumper 355 disposed on the left side is pivotally supported by another stay 356 disposed on a side of the machine body 2 (the transmission case 219L). The dumper 355 disposed on the right side supports the travel lever 244R. The dumper 355 disposed on the left side supports the travel lever 244L. The dumpers 355 can be stretched and shortened by the swinging of the travel levers 244R and 244L, generating relatively low resistance when the travel levers 244R and 244L are swung at a relatively low speed. The dumpers 355 each generate high resistance when the travel levers 244R and 244L are swung at an excessively high speed.

As described above, the joint member 342 joints the first attachment member 340 to the second attachment member 341, the first attachment member 340 being attached on the transmission case 219R disposed on the right side, the second attachment member 341 being attached on the transmission case 219L disposed on the left side. And, the joint member 342 supports the travel lever 244R disposed on the right side and the travel lever 244L disposed on the left side, and thereby the travel lever 244R and the travel lever 244L being capable of freely swinging. In this manner, the first attachment member 340, the second attachment member 341, and the travel levers 244R and 244L are assembled to be one component. The assembled component can be placed on the transmission cases 219R and 219L from above and can be assembled to the transmission cases 219R and 219L, thereby simplifying the assembly of the transmission levers 244R and 244L.

In addition, the front wall 347 and the rear wall 348 are disposed on each of the first attachment member 340 and the second attachment member 341, the front wall 347 and the rear wall 348 having the stoppers 353 or the stoppers 354. Thus, the stoppers 353 and 354 can be attached together with the first attachment member 340 and the second attachment member 341, and thereby the assembly of the stoppers 353 and 354 can be simplified.

Figure 14:
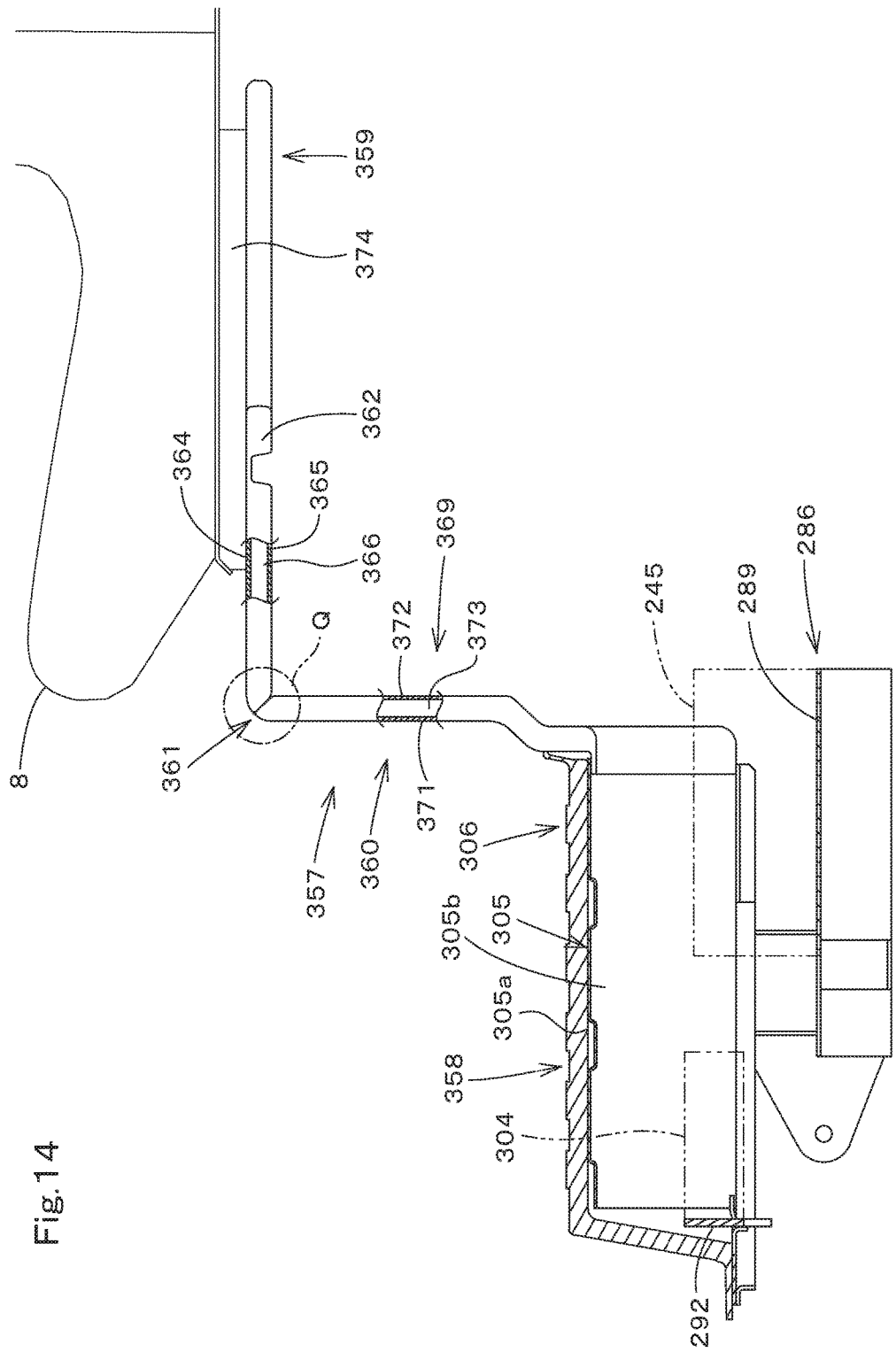
FIG. 14 is a side cross-sectional view around an operator seat according to the embodiment.
Figure 15:
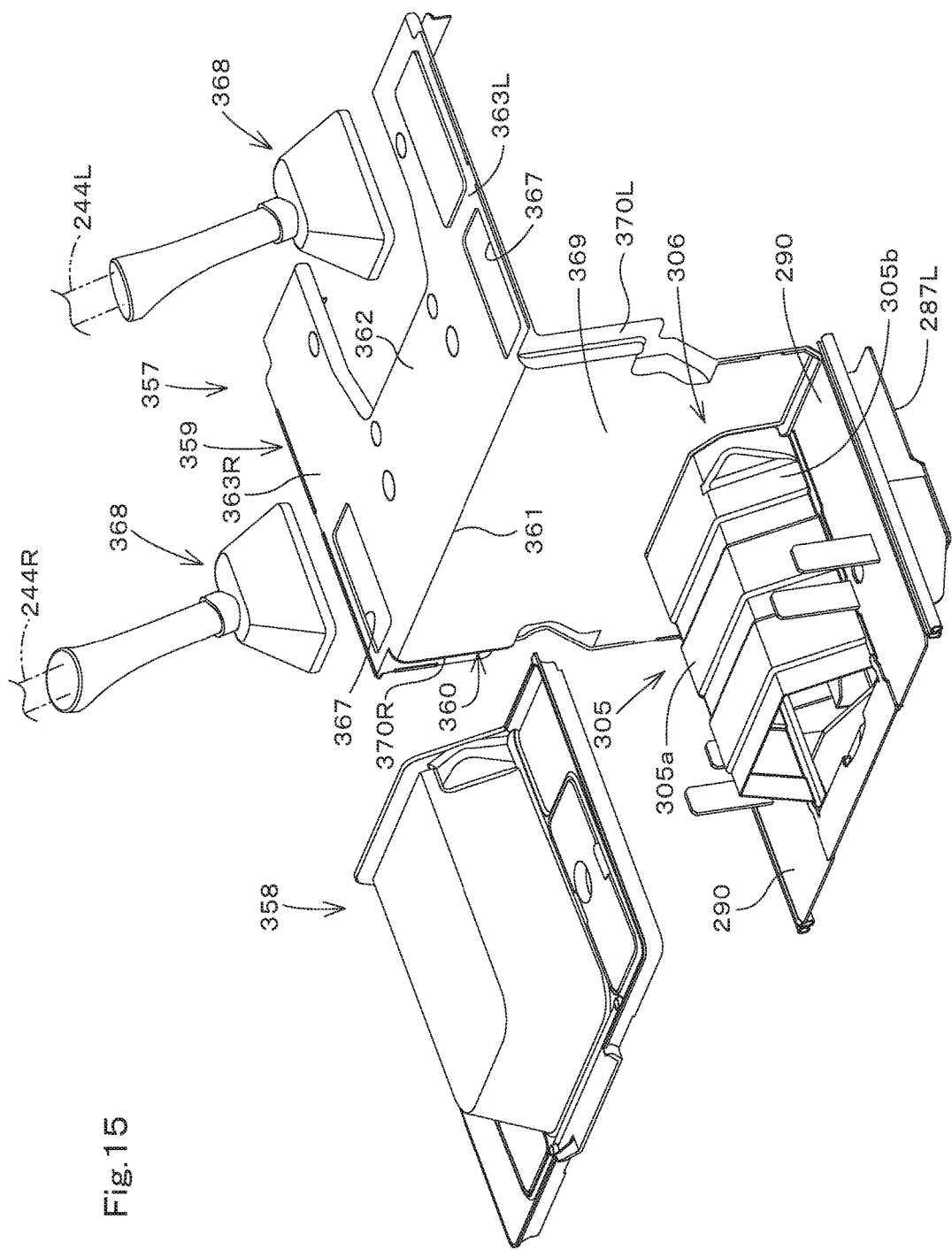
FIG. 15 is a perspective view of a cover member and a floor step according to the embodiment.
Figure 20:
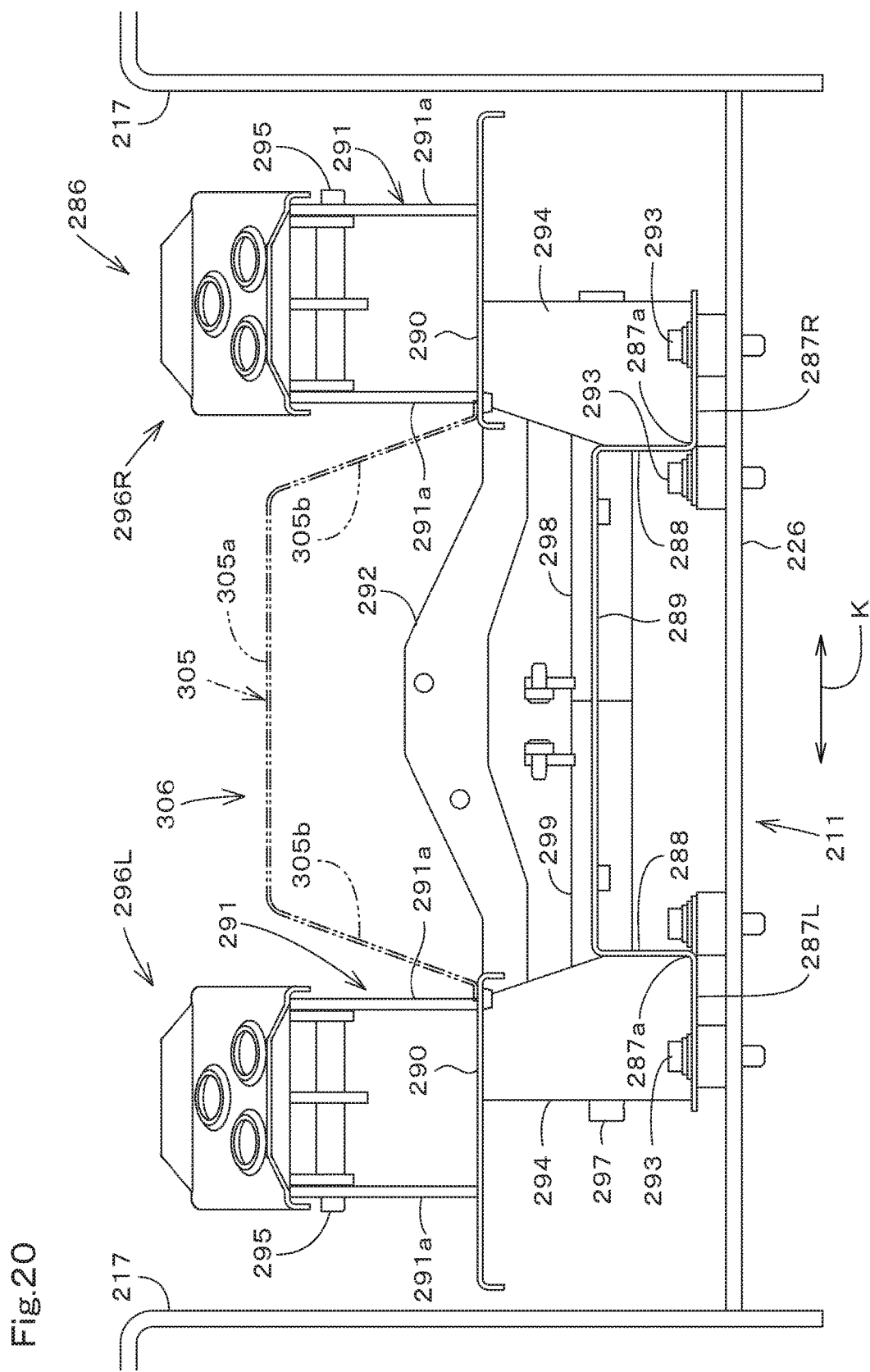
FIG. 20 is a back view of the support base according to the embodiment.

As shown in FIG. 14, FIG. 15, and FIG. 20, a floor step 306 is disposed below and in front of the operator seat 8. The floor step 306 constitutes a floor formed in front of the operator seat 8, and includes foot steps 290 and a center step 305. One of the foot steps 290 is disposed the right side in front of the operator seat 8. The other one of the foot steps 290 is disposed the left side in front of the operator seat 8. The center step 305 is arranged between the foot step 290 disposed on the right side and the foot step 290 disposed on the left side.

The center step 305 includes an upper wall 305a and side walls 305b. The upper wall 305a is arranged above the mount portion 289 described later and above the foot steps 290. Each of the side walls 305b extends from a rim of the upper wall 305a to the foot step 290. The mount portion 289, the operation control valve 245, and a switch valve 304 are arranged below the floor step 306.

A step cover 358 is disposed on the floor step 306, the step cover 358 being formed of rubber. The step cover 358 covers upper portions of the foot step 290 and the center step 305.

A cover member 357 is disposed behind the floor step 306 and under the operator seat 8. The cover member 357 covers a portion under the operator seat 8.

The cover member 357 includes a first cover 359, a second cover 360, and a hinge 361. The first cover 359 is arranged under the operator seat 8. The second cover 360 is disposed between: a front end of the first cover 359; and a rear end of the floor step 306 (rear ends of the foot steps 290 and the center step 305). The hinge 361 joints the front end of the first cover 359 to an upper end of the second cover 360. In this manner, the second cover 360 is capable of freely swinging about the hinge 361 jointed to the first cover 359.

The first cover 359 includes a first main cover portion 362, an extending portion 363L, and an extending portion 363R.

The first main cover portion 362 is arranged under the operator seat 8, and contacts to a cushion member 374, the cushion member 374 being disposed on a lower surface side of the operator seat 8. The operator seat 8 is mounted on the first main cover portion 362. The extending portion 363R is disposed on the right side of the first main cover portion 362. The extending portion 363L is disposed on the left side of the first main cover portion 362. The extending portion 363R disposed on the right side protrudes rightward toward the machine body 2. The extending portion 363L disposed on the left side protrudes leftward toward the machine body 2. The extending portion 363R and the extending portion 363L are attached to a bracket fixed to the machine body 2.

Figure 16:
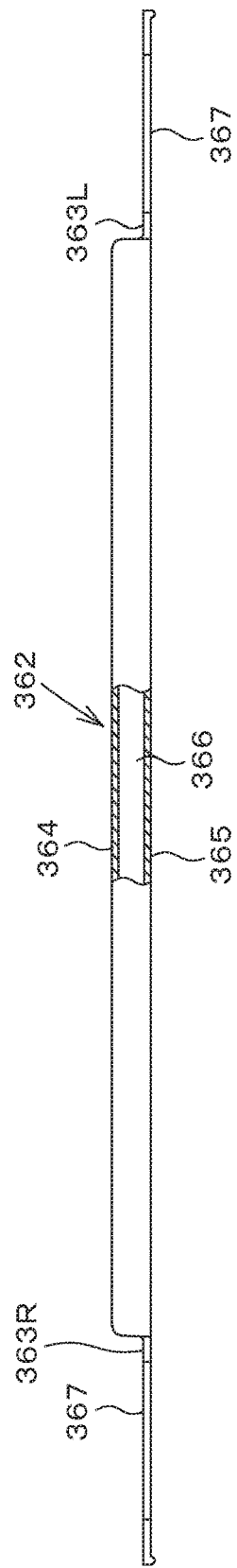
FIG. 16 is a font cross-sectional view of a first cover of the cover member according to the embodiment.

As shown in FIG. 14 and FIG. 16, the first main cover portion 362 includes an upper wall 364 and a lower wall 365. The upper wall 364 and the lower wall 365 constitute a space 366. The space 366 contains the air (gas). In other words, the first main cover portion 362 is hollow.

The extending portion 363R has a circular rim on a front portion of the extending portion 363R, the circular rim forming a through hole 367 for inserting the travel lever 244R. The extending portion 363L has a circular rim on a front portion of the extending portion 363L, the circular rim forming another through hole 367 for inserting the travel lever 244L. Each of the circular rims forming the through holes 367 has a rectangular shape in a plan view. A resin cover 368 is disposed on a portion corresponding to the through hole 367 of the extending portion 363R, the resin cover 368 being configured to cover the travel lever 244R. And, another resin cover 368 is disposed on a portion corresponding to the through hole 367 of the extending portion 363L, the another resin cover 368 being configured to cover the travel lever 244L.

The second cover 360 includes a second main cover portion 369, an attachment portion 370R, and an attachment portion 370L. The attachment portion 370R is disposed on the right side of the second main cover portion 369. The attachment portion 370L is disposed on the left side of the second main cover portion 369. The attachment portions 370R and 370L are attached to a bracket fixed to the machine body 2.

Figure 17:
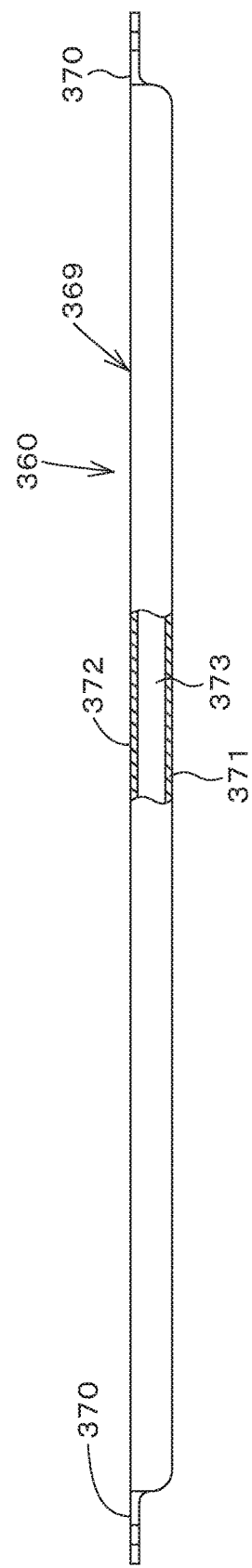
FIG. 17 is a plan cross-sectional view of a second cover of the cover member according to the embodiment.

As shown in FIG. 17, the second main cover portion 369 includes a front wall 371 and a rear wall 372. The front wall 371 and the rear wall 372 constitute a space 371. The space 371 contains the air (gas). In other words, the second main cover portion 369 is hollow.

Figure 18:
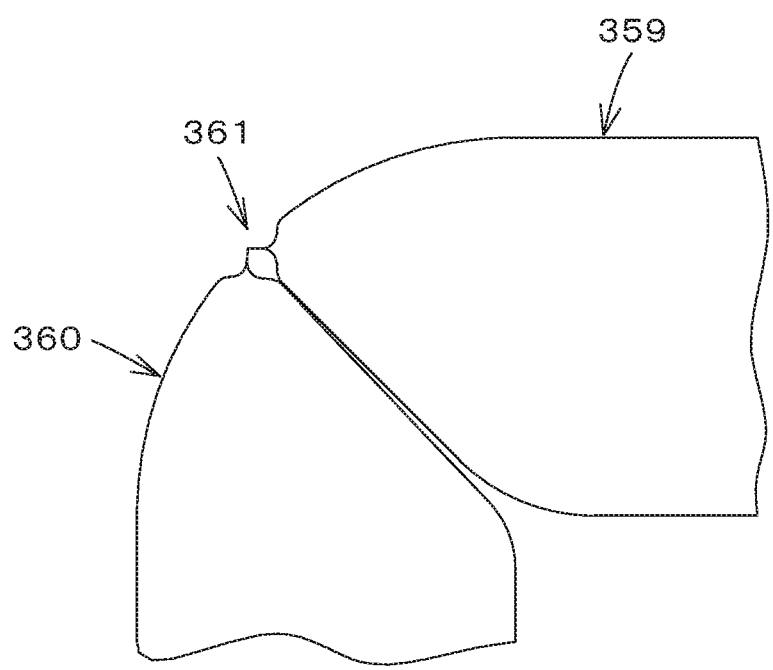
FIG. 18 is an enlarged view of a Q section in FIG. 14.

As shown in FIG. 18, the hinge 361 reduces thickness of a part of portion of the hinge 361, the portion being jointed to the first cover 359 and the second cover 360.

The cover member 357 is formed by the blow molding in the embodiment.

If a vertically bending sheet metal serves as the cover member 357, it is hard to move the vertically bending sheet metal (instead of the cover member 357) from above, being close to the travel levers 244R and 244L. In particular, the vertically bending sheet metal is required to be prevented from contacting to peripheral parts disposed around the travel levers 244R and 244L in assembly for inserting the travel levers 244R and 244L into the through holes 367. The assembly is very hard and sensitive. That is, it requires so much time and effort to insert the travel levers 244R and 244L through the cover member 357.

On the contrary, in the cover member 357 according to the embodiment, the hinge 361 joints the second cover 360 to the first cover 359. In this manner, the second cover 360 can be turned to be flat in plane continuing from the first cover 359 in the assembly, and the travel levers 244R and 244L can be inserted into the through holes 367. Thus, the travel levers 244R and 244L can be easily inserted into the through holes 367, and thereby the cover member 357 can be easily assembled.

In addition, the vertically bending sheet metal (instead of the cover member 357) requires heat insulators in a large area of a surface of the vertically bending sheet metal. On the contrary, the cover member 357 according to the embodiment includes the air space formed by the blow molding, the air space providing an effect of the heat insulation, thereby not requiring to adhere the heat insulators to the cover member 357.

Figure 19:
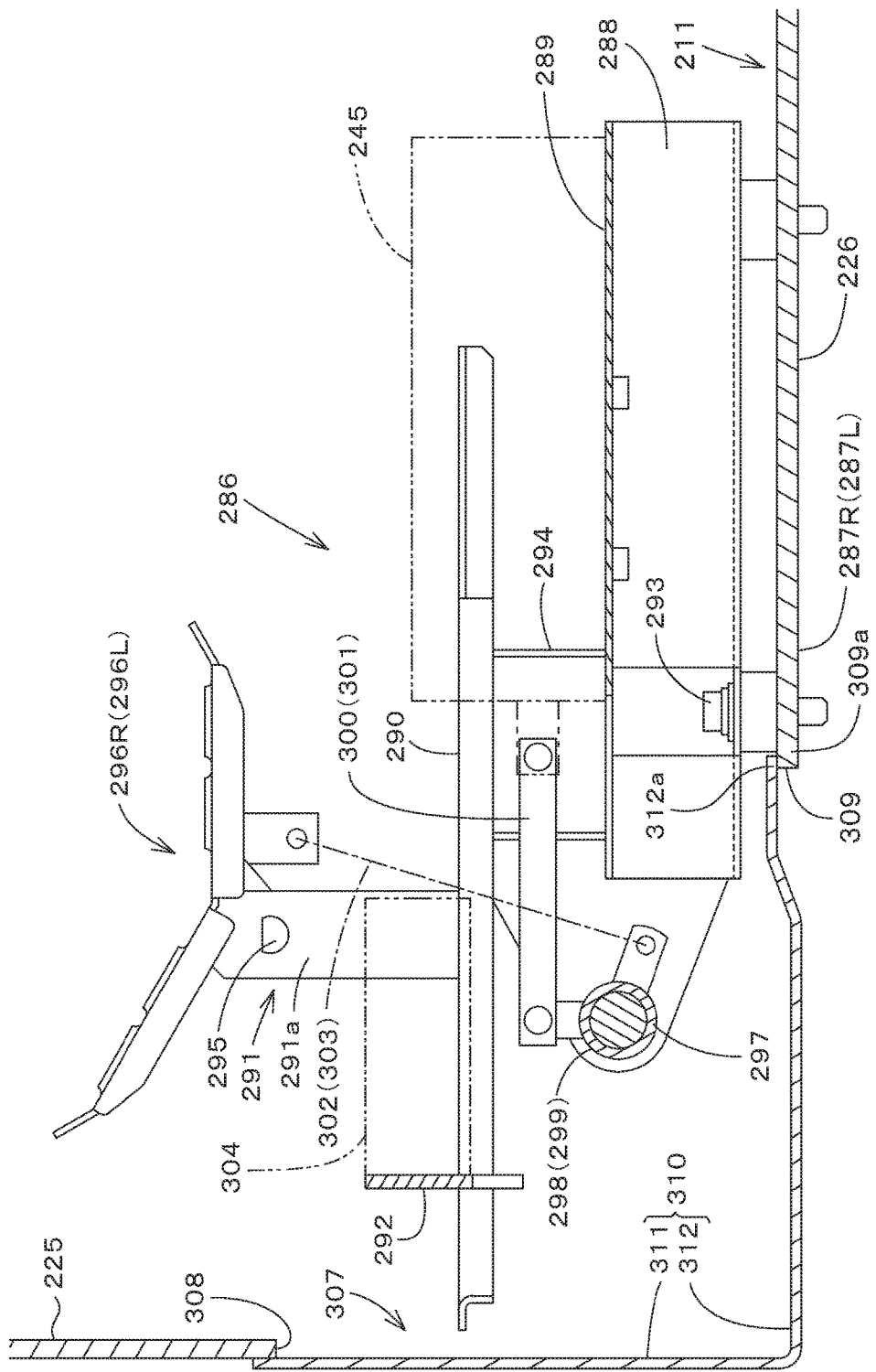
FIG. 19 is a side cross-sectional view of a support base according to the embodiment.
Figure 21:
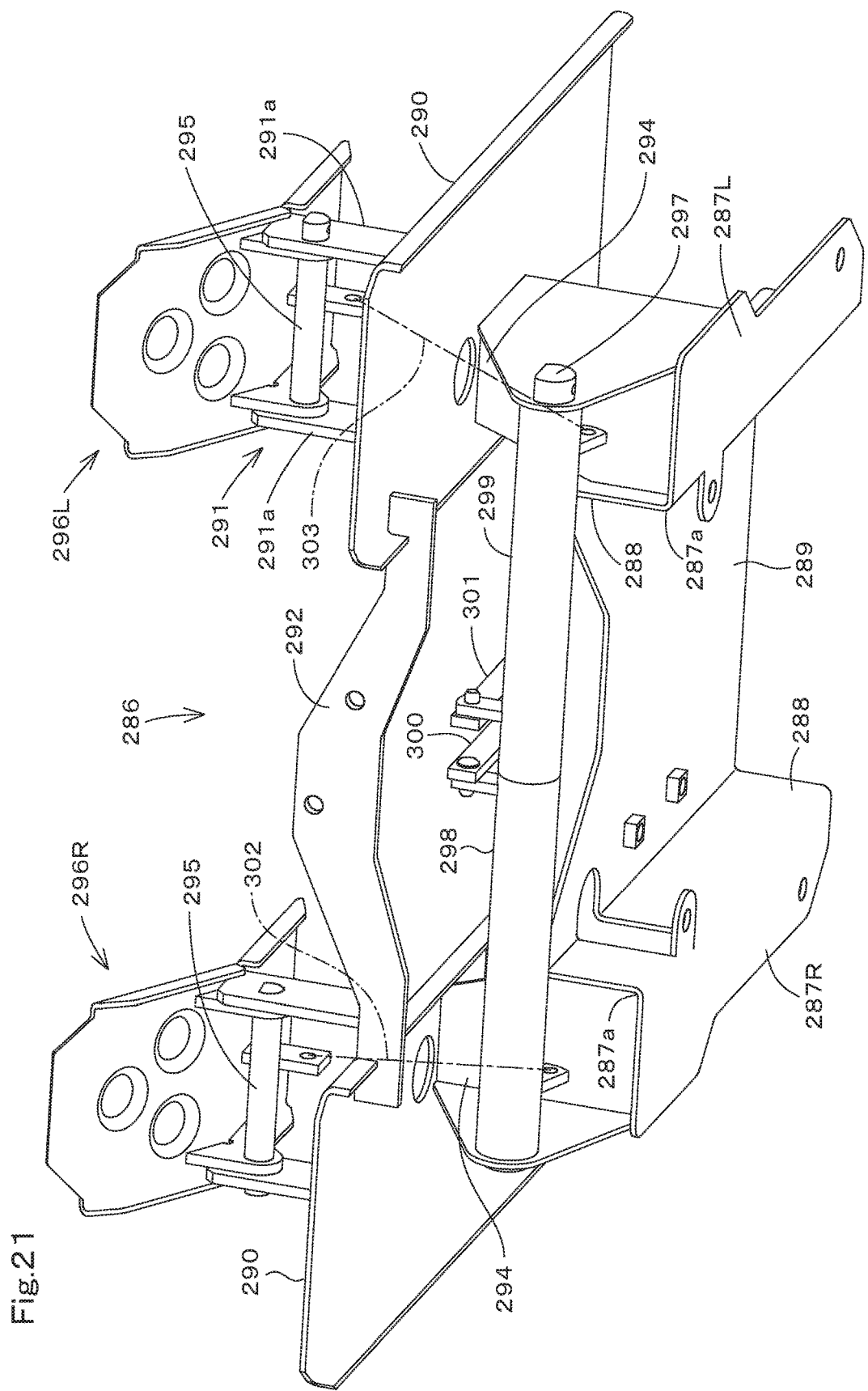
FIG. 21 is a schematic perspective view of the support base, upwardly showing the front of the support base.

As shown in FIG. 19 to FIG. 21, a support base 286 is attached to a front portion of the main plate 226. The support base 286 is formed of a plurality of plate members in combination of the plate members, and includes an attachment portion 287R, an attachment portion 287L, leg portions 288, the mount portion 289, the foot steps 290, pedal attachment portions 291, and a joint stay 292.

The attachment portion 287R is disposed close to a right side of the main plate 226. The attachment portion 287L is disposed close to a left side of the main plate 226. The attachment portions 287R and 287L are each fixed to the main plate 226 by bolts 293.

One of the leg portions 288 stands up upward from the attachment portion 287R. The other one of the leg portions 288 stands up from the attachment portion 287L. In the example shown by the drawings, one of the leg portions 288 extends upward from an end portion 287a of the attachment portion 287R, the end portion 287a being disposed on the attachment portion 287R and being close to a center in the machine width direction K, and the other one of the leg portions 288 extends upward from an end portion 287a of the attachment portion 287L, the end portion 287a being disposed on the attachment portion 287L and being close to a center in the machine width direction K.

The mount portion 289 joints an upper end of the leg portion 288 disposed on the right side to an upper end of the leg portion 288 disposed on the left side. The operation control valve 245 is mounted on the mount portion 289. The operation control valve 245 is transversely mounted on an upper surface of the mount portion 289.

One of the foot steps 290 is disposed above the attachment portion 287R disposed on the right side, and the other one of the foot steps 290 is disposed above the attachment portion 287L disposed on the left side. One of the foot steps 290 is fixed to an upper end of the support bracket 294 disposed on an upper surface of the attachment portion 287R, and the other one of the foot steps 290 is fixed to an upper end of the support bracket 294 disposed on an upper surface of the attachment portion 287L. In addition, the foot steps 290 are arranged above the mount portion 289.

One of the pedal attachment portions 291 is disposed on the foot step 290 disposed on the right side, and the other one of the pedal attachment portions 291 is disposed on the foot step 290 disposed on the left side. Each of the pedal attachment portions 291 is constituted of a pair of support plates 291a. The pair of support plates 291a are arranged to be opposite to each other in the machine width direction K. A pedal shaft 295 is disposed between upper portions of the pair of the support plates 291a. A pedal 296R is supported by one of the pedal shafts 295, thereby being capable of freely swinging, and a pedal 296L is supported by the other one of the pedal shafts 295, thereby being capable of freely swinging. In this manner, the pedals 296R and 296L are capable of being pressed by swinging forward and backward.

Each of the support brackets 294 includes a support shaft 297, the support shaft 297 having an axis extending along the machine width direction K. A first cylindrical member 298 is fitted (engaged) to a right portion of the support shaft 297, and a second cylindrical member 299 is fitted (engaged) to a left portion of the support shaft 297. The first cylindrical member 298 is capable of turning about the axis of the support shaft 297. The second cylindrical member 299 is capable of turning about the axis of the support shaft 297.

A first link 300 is jointed to the first cylindrical member 298 at one end of the first link 300. The first link 300 is jointed to a spool of the bucket control valve at the other end of the first link 300. A second link 301 is jointed to the second cylindrical member 299 at one end of the second link 301. The second link 301 is jointed to a spool of the boom control valve at the other end of the second link 301.

In addition, a third link 302 is jointed to the first cylindrical member 298 at one end of the third link 302. The third link 302 is jointed to the pedal 296R disposed on the right side at the other end of the third link 302. A fourth link 303 is jointed to the second cylindrical member 299 at one end of the fourth link 303. The fourth link 303 is jointed to the pedal 296L disposed on the left side at the other end of the fourth link 303.

In this manner, the bucket control valve can be controlled by the pedal 296R disposed on the right side, the bucket control valve being configured to control the bucket cylinder 15. In addition, the boom control valve can be controlled by the pedal 296L disposed on the left side, the boom control valve being configured to control the boom cylinder 14.

The joint stay 292 joints a front portion of the foot step 290 disposed on the right side to a front portion of the foot step 290 disposed on the left side. A switch valve 304 is attached to a rear surface of the joint stay 292. The switch valve 304 includes a speed switch valve and a brake switch valve. The speed valve is a valve for switching the travel motors 223R and 223L into a low-speed mode and into a high-speed mode. The brake valve is a valve for turning on and off the brakes of the travel motors 223R and 223L.

As described above, the support base 286 includes: the attachment portions 287R and 287L attached to the bottom frame portion 211 of the machine body 2; the leg portions 288 standing upward from the attachment portions 287R and 287L; and the mount portion 289 disposed on the upper side of the leg portions 288. And, the support base 286 mounts the operation control valve 245 on the mount portion 289. In this manner, the operation control valve 245 can be installed being floated (separated upward) from the bottom portion of the machine body 2, and thereby the operation control valve 245 can be prevented from deposition of mud on the operation control valve 245.

In addition, the pedals 296R and 296L are supported on the support base 286 mounting the operation control valve 245, the pedals 296R and 296L being configured to operate the operation control valve 245. Accordingly, a joint mechanism for jointing the operation control valve 245 to the pedals 296R and 296L can be compactly configured.

Moreover, the operation control valve 245, the pedals 296R and 296L, and the joint mechanism for jointing the operation control valve 245 to the pedals 296R and 296L are assembled to the support base 286, and accordingly the assembled structure can be easily assembled to the machine body 2 in a production line.

As shown in FIG. 1, FIG. 2, and FIG. 19, a circular rim for forming an opening 307 for cleaning (a cleaning opening 307) is disposed on a corner portion between the front frame portion 210 and the bottom frame portion 211. In particular, a rim for forming a first opening 308 is formed on the lower plate 225 of the front frame portion 210, and a rim for forming a second opening 309 is formed on the main plate 226 of the bottom frame portion 211. The rim for forming the first opening 308 and the rim for forming the second opening 309 are jointed to each other on the corner portion, thereby forming the circular rim for forming the cleaning opening 307. In other words, the cleaning opening 307 is formed of the first opening 308 and the second opening 309.

The cleaning opening 307 is closed by a closing plate 310. The closing plate 310 includes a first portion 311 and a second portion 312. The first portion 311 closes the first opening 308. The second portion 312 closes the second opening 309. The first portion 311 extends upward from a front end of the second portion 312.

A rear end 312a of the second portion 312 is placed on a wall portion 309a, the wall portion 309a forming the rim of the second opening 309. As shown in FIG. 2, the first portion 311 is fixed to the lower plate 225 of the front frame portion 210 by bolts. The closing plate 310 can be moved downward contacting the rear end 312a of the second portion 312 to the wall portion 309a, that is, centering about the rear end 312a when the bolts 375 are detached. The mud deposited on a front portion of the bottom of the machine body 2 can be removed when the closing plate 310 is moved downward.

Figure 22:
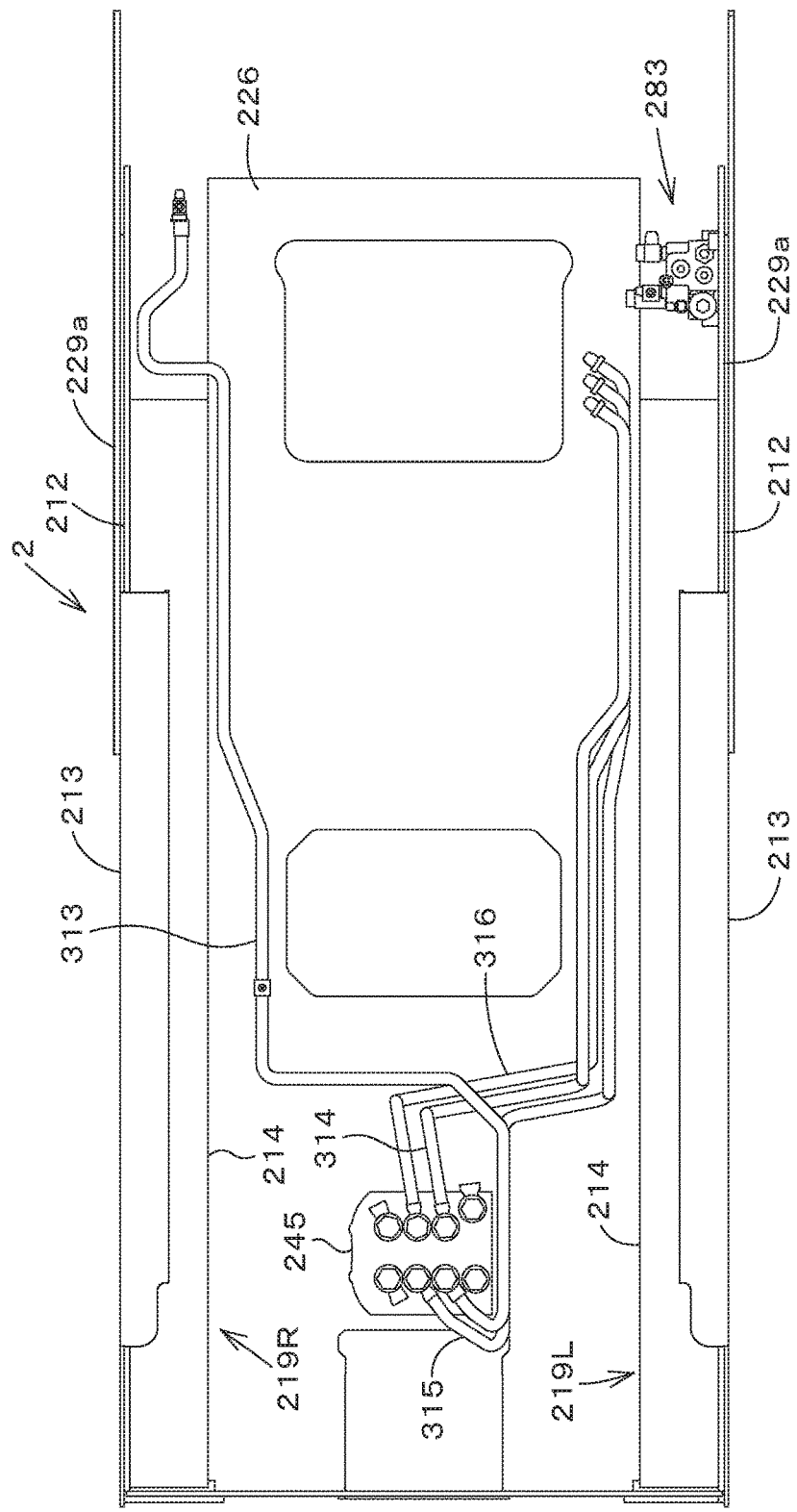
FIG. 22 is a plan view showing piping of a operation control valve according to the embodiment.

FIG. 22 shows four steel tubes (four hydraulic pipes), that is, a first steel tube 313, a second steel tube 314, a third steel tube 315, and a fourth steel tube 316, the four steel tubes being disposed backward from the operation control valve 245.

The first steel tube 313 and the second steel tube 314 are steel tubes for supplying a hydraulic operation fluid outputted from the boom control valve. The third steel tube 315 and the fourth steel tube 316 are steel tubes for supplying a hydraulic operation fluid outputted from the bucket control valve. The first steel tube 313 is extended along an inner surface of the transmission case 219R disposed on the right side, that is, along the third plate member 217 of the transmission case 219R disposed on the right side. The second steel tube 314 to the fourth steel tube 316 are extended along an inner surface of the transmission case 219L disposed on the left side, that is, along the third plate member 217 of the transmission case 219L disposed on the left side.

The first steel tube 313 to the fourth steel tube 316 are extended along the inner surfaces of the transmission cases 219R and 219L, the first steel tube 313 to the fourth steel tube 316 being disposed backward from the operation control valve 245, and thereby the inner surfaces of the transmission cases 219R and 219L are efficiently used. In other words, free spaces formed of the inner surfaces of the transmission cases 219R and 219L can be efficiently used. Meanwhile, the first steel tube 313 to the fourth steel tube 316 are installed being floated (separated upward) from the bottom portion of the machine body 2, and thereby the first steel tube 313 to the fourth steel tube 316 can be prevented from deposition of mud on the four steel tubes when the mud is deposited on the bottom portion of the machine body 2. Hydraulic hoses not shown in the drawings are connected to the second steel tube 314 to the fourth steel tube 316, the hydraulic hoses are connected to the bucket level control valve 283. In this manner, the stresses applied in the assembly is released.

Figure 23:
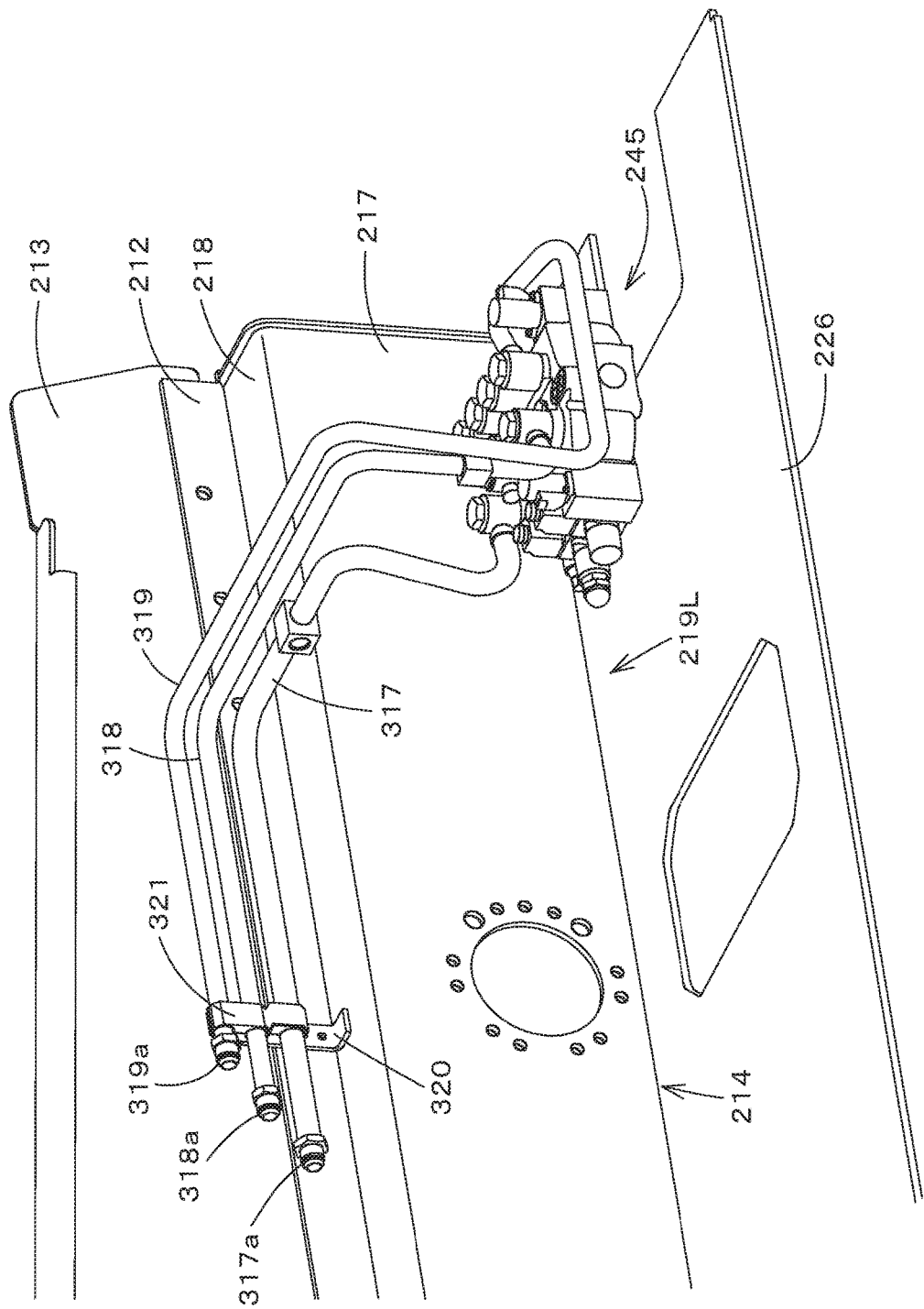
FIG. 23 is a perspective view showing the piping of the operation control valve according to the embodiment.

FIG. 23 shows three steel tubes (three hydraulic pipes), that is, a fifth steel tube 317, a sixth steel tube 318, and a seventh steel tube 319, the three steel tubes being disposed backward from the operation control valve 245. The fifth steel tube 317 to the seventh steel tube 319 are steel tubes for supplying a hydraulic operation fluid outputted from the attachment control valve.

The fifth steel tube 317 to the seventh steel tube 319 stand up upward from the operation control valve 245 and extend toward the transmission case 219L disposed on the left side, and then extend backward along the transmission case 219L above the transmission case 219L disposed on the left side. That is, the fifth steel tube 317 to the seventh steel tube 319 extend backward along the transmission case 219L disposed on the left side, that is, along an upper surface of the fourth plate member 218.

In addition, the fifth steel tube 317 to the seventh steel tube 319 are attached to a support stay 320 by a clamp 321, the support stay 320 being fixed on the transmission case 219L (the fourth plate member 218) disposed on the left side.

A connection member 317a, a connection member 318a, and a connection member 319a are disposed to end portions of the fifth steel tube 317, the sixth steel tube 318, and the seventh steel tube 319, respectively, each of the connection members 317a to 319a being configured to be connected to a hydraulic hose. The hydraulic hoses connected to the connection members 317a to 319a are connected to a hydraulic pressure extraction member 322 through an inside of the boom 10 disposed on the left side from the rear end side of the machine body 2, the hydraulic pressure extraction member 322 being disposed on a side of an front portion of the boom 10.

The fifth steel tube 317 to the seventh steel tube 319 are each connected to the corresponding hydraulic hoses above the transmission case 219L. Accordingly, a working space required for connection and fixation of the hydraulic hoses can be formed, thereby enabling steady assembly of the hydraulic hoses. In addition, the connection members 317a to 319a, the support stay 320, and the clamp 321 are disposed above the transmission case 219L, thereby eliminating bad influence of the mud to the connection members 317a to 319a, the support stay 320, and the clamp 321.

Figure 24:
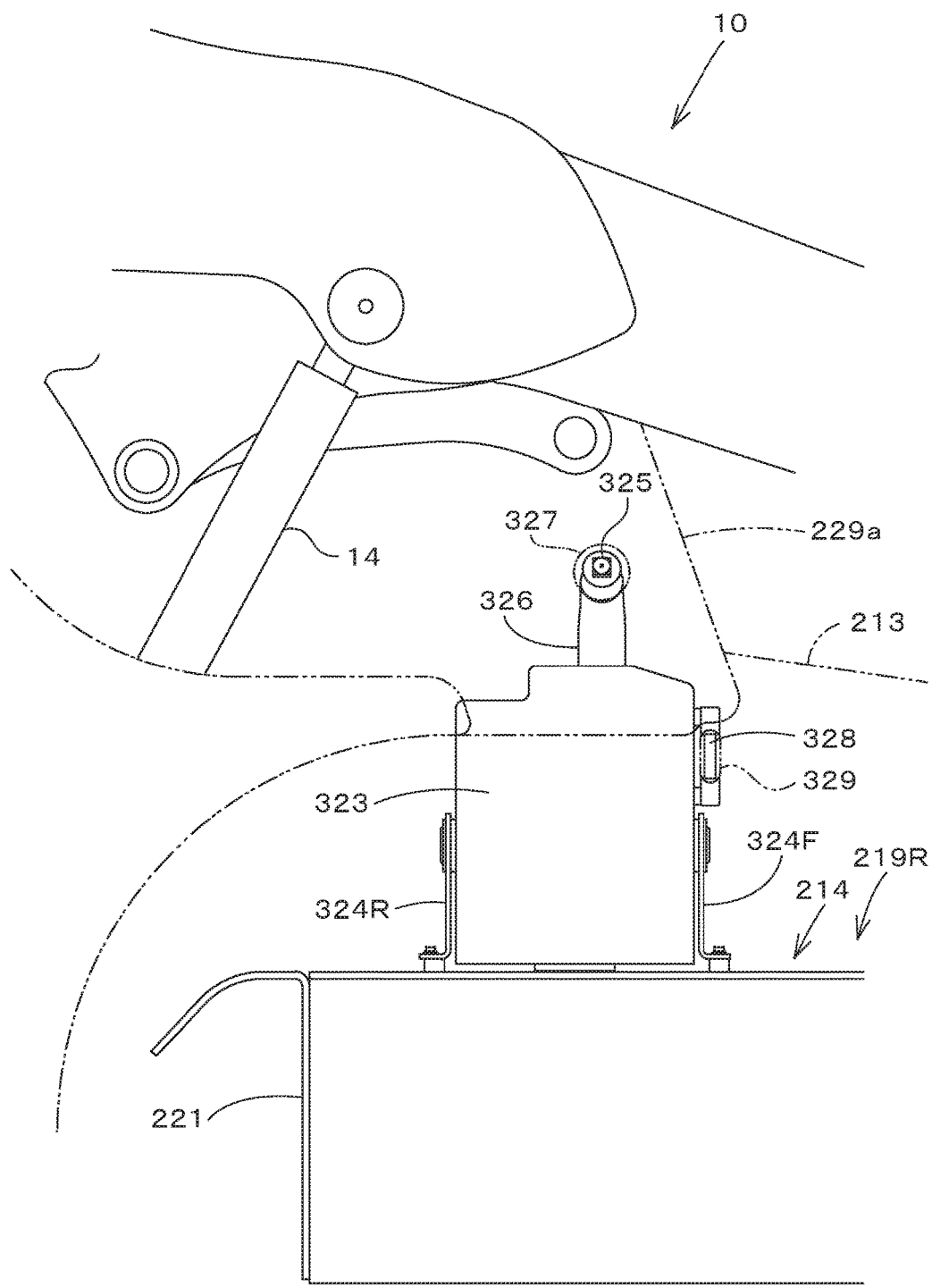
FIG. 24 is a right side view showing arrangement of a hydraulic operation fluid tank according to the embodiment.
Figure 26:
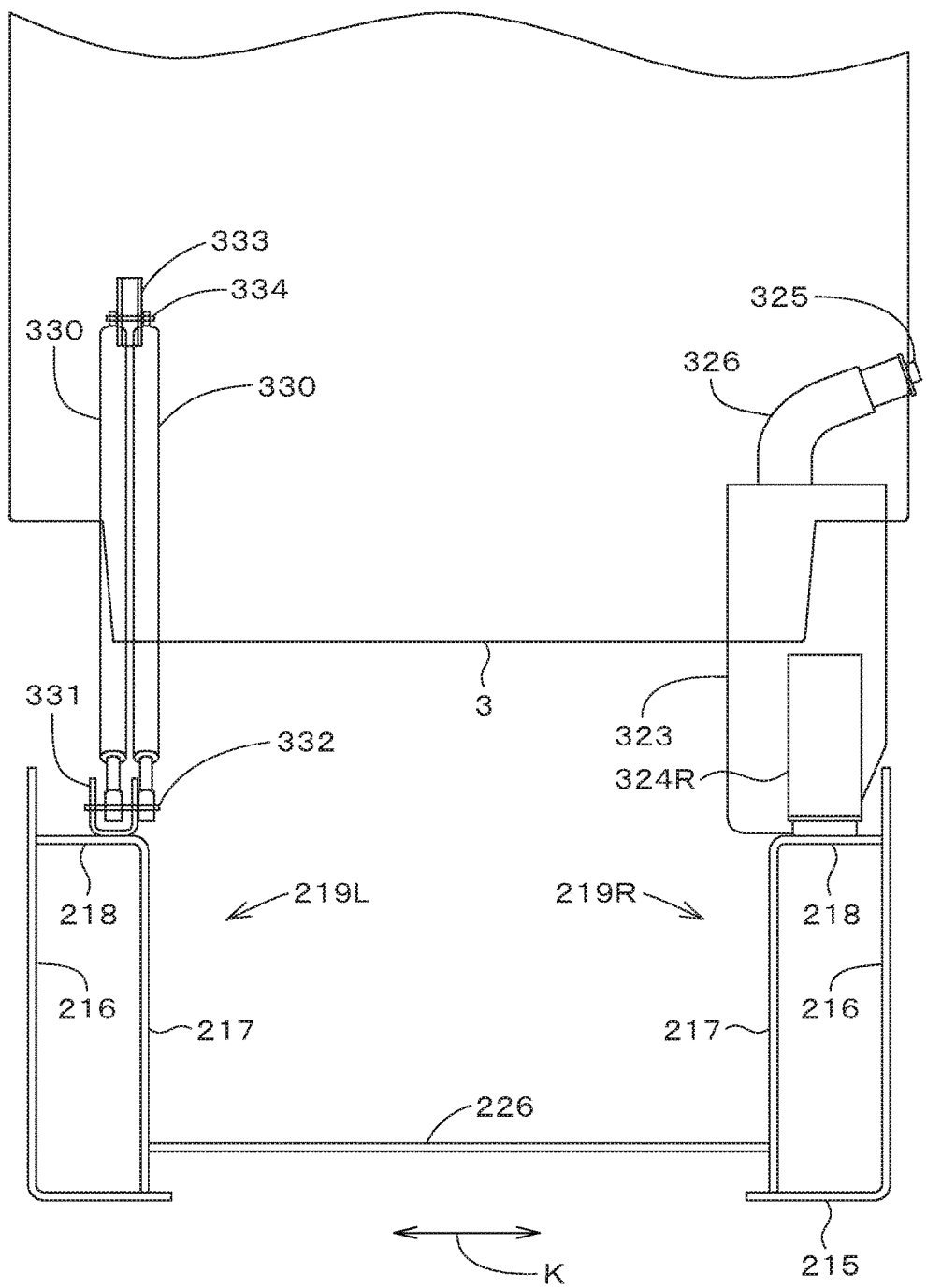
FIG. 26 is a back view showing the arrangement of the hydraulic operation fluid tank and the gas spring according to the embodiment.

As shown in FIG. 24 to FIG. 26, a hydraulic operation fluid tank 323 is disposed on an upper surface of the transmission case 219R disposed on the right side, the hydraulic operation fluid tank 323 being configured to store the hydraulic operation fluid. In particular, a pair of attachment brackets 324R and 324F are disposed on the transmission case 219R disposed on the right side, that is, the pair of attachment brackets 324R and 324F are disposed on an upper surface of the fourth plate member 218. The attachment bracket 324F, one of the attachment brackets, supports a front surface of the hydraulic operation fluid tank 323, and the attachment bracket 324R, the other one of the attachment brackets, supports a rear surface (a back surface) of the hydraulic operation fluid tank 323. The hydraulic operation fluid tank 323 is disposed on the transmission case 219R, and thereby a space formed above the transmission case 219R is efficiently used and thereby an installation place for the hydraulic operation fluid tank 323 is formed.

A fluid filler tube 326 is disposed on an upper portion of the hydraulic operation fluid tank 323, the fluid filler tube 326 having a fluid filler opening 325. The fluid filler tube 326 bends toward the support frame 206 disposed on the right side, that is, toward the support wall 229a. The support wall 229a has an opening 327 for exposing the fluid filler opening 325 outward. In addition, a fluid gauge (an oil gauge) 328 is disposed on the front portion of the hydraulic operation tank 323, the fluid gauge 328 being used for confirmation of an amount of the hydraulic operation fluid. A visually-checking window 329 is disposed on the upper plate member 213 of the right frame portion 208 of the machine body 2, the visually-checking window 329 being used for visually checking the fluid gauge 328. The fluid filler opening 325 and the fluid gauge 328 are placed below the booms 10 under a state where the booms 10 are down to the lowest position. In addition, the fluid filler opening 325 and the fluid gauge 328 are disposed between the front wheel 5F and the rear wheel 5R.

The opening 327 and the visually-checking window 329 are disposed on the machine body 2, and the fluid filler opening 325 and the fluid gauge 328 are disposed below the booms 10 under the state where the booms 10 are down to the lowest position. Accordingly, the fluid level and the fluid gauge 328 can be arbitrarily checked. In particular, the fluid filler opening 325 and the fluid gauge 328 are disposed between the front wheel 5F and the rear wheel 5R. Thus, the operator can approach the machine body 2 from a space between the front wheel 5F and the rear wheel 5R. Moreover, the operator can easily fill the fluid, checking the fluid gauge 328.

In addition, considering a case where the hydraulic operation tank 323 is disposed in the bonnet 530, the fluid level and the fluid gauge 328 cannot be confirmed without opening the bonnet 530. And, if there is no space for opening the bonnet 530, the fluid level and the fluid gauge 328 cannot be confirmed. However, the embodiment does not have the above-mentioned problems that interfere the confirmation of the fluid level and the fluid gauge 328.

As shown in FIG. 25 and FIG. 26, a pair of gas springs 330 are disposed on the transmission case 219L not mounting the hydraulic operation tank 323, of the transmission case 219R disposed on the right side and the transmission case 219L disposed on the left side. That is, the pair of gas springs 330 are arranged on the transmission case 219L, the transmission case 219L being disposed on a side opposite to the hydraulic operation tank 323. The pair of gas springs 330 are arranged along the machine width direction K. Further in other words, the hydraulic operation tank 323 is disposed on one of the pair of transmission cases 219R and 219L, and the pair of the gas springs 330 are disposed on the other one of the transmission cases 219R and 219L.

The gas springs 330 is stretched to assist the swinging of the cabin 3 in lifting-up of the cabin 3 centering about the pivot shaft 238. In addition, the cabin 3 is held to be lifted up when the gas springs 330 fully are stretched. A first support stay 331 is fixed to the upper surface of the fourth plate member 218 of the transmission case 219L. One first pin 332 is disposed on the first support stay 331. Lower portions (lower end portions) of the pair of the gas springs 330 are pivotally supported by the first pin 332. Upper portions (upper end portions) of the pair of the gas springs 330 are pivotally supported on a second support stay 333 by one second pin 334, the second support stay 333 being fixed to a lower rear portion of the cabin 3.

The gas springs 330 are disposed on one of the transmission cases 219R and 219L, and thereby the space formed above the corresponding one of the transmission cases 219R and 219L is efficiently used and thereby an installation place for the gas springs 330 is formed. Two of the gas springs 330 are disposed, thereby one of the gas springs 330 can support the cabin 3 even when the other one of the gas springs 330 is broken. In addition, two of the gas springs 330 are disposed on one side (on the left side in the embodiment), thereby sharing the first support stay 331, the second support stay 333, the first pin 332, and the second pin 334 to reduce the number of the parts (components).

Figure 27:
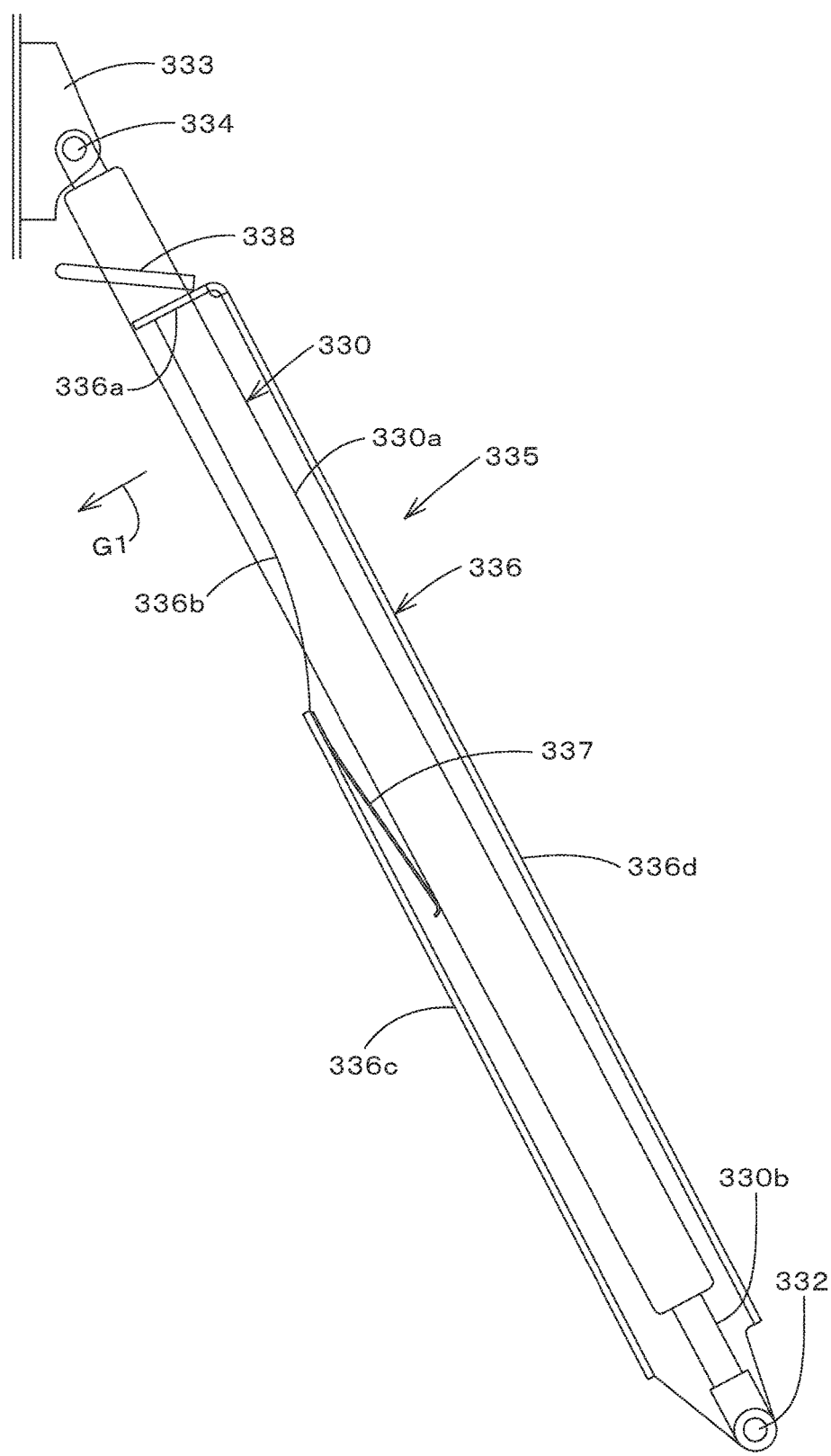
FIG. 27 is a side view showing a regulation member according to the embodiment under a condition where the gas spring is shortened.
Figure 28:
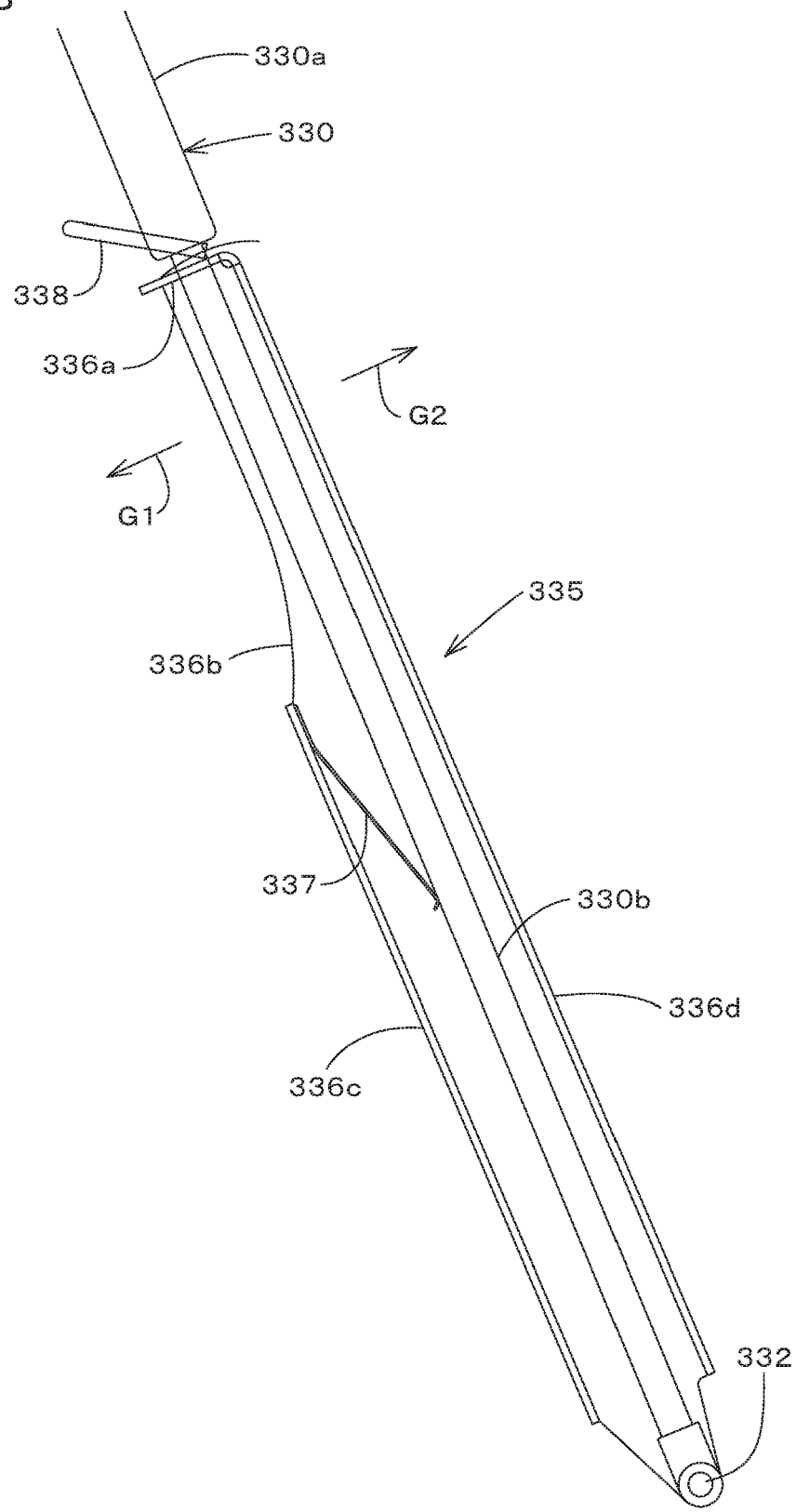
FIG. 28 is a side view showing the regulation member according to the embodiment under a condition where the gas spring is stretched.

As shown in FIG. 27 and FIG. 28, the gas spring 330 may be provided with a restriction member 335. The restriction member 335 is a member for restricting the stretching and shortening of the gas springs 330 when the gas springs 330 are stretched to the maximum extent. The restriction member 335 includes a main body 336, a spring member 337, and a handle 338.

The main body 336 includes an upper wall 336a, a side wall 336b, a front wall 336c, and a rear wall 336d.

The upper wall 336a includes: a first portion (not shown in the drawings) configured to be fitted into a tube 330a of the gas spring 330; and a second portion (not shown in the drawings) configured to be fitted into a rod 330b of the gas spring 330. An lower end of the side wall 336b is pivotally supported by the first pin 332 disposed on an lower end of the gas spring 330.

The spring member 337 is arranged between the front wall 336c and the tube 330a. The spring member 337 presses the main body 336 to a direction shown by an arrowed line G1 so that the side wall 336b can be close to the tube 330a. The handle 338 is disposed on the upper wall 336a.

In the restriction member 335, the upper wall 336a slides on the tube 330a when the gas spring 330 is stretched. As shown in FIG. 21, when the gas springs 330 are stretched to the maximum extent, the main body 336 swings in the direction shown by the arrowed line G1 since the main body 336 is pressed by the spring member 337 toward the direction shown by the arrowed line G1. Thus, the second portion of the upper wall 336a is fitted to the rod 330d.

In this manner, the upper wall 336a can contact to a lower end portion of the tube 330a, thereby restricting the shortening of the gas spring 330. The second portion of the upper wall 336a can be detached from the rod 330b when the handle 338 is pinched to swing the main body 336 in a direction shown by an arrowed line G2. That is, when the main body 336 is swung in the direction shown by the arrowed line G2, the swing releases the restriction of the stretching and shortening of the gas spring 330.

Accordingly, the restriction member 335 is capable of having two positions; one of the two positions is a restricting position where the second portion is fitted to the rod 330b of the gas spring 330, and the other one of the two positions is an allowance position where the second portion is detached from the rod 330b. And, the restriction member 335 contacts to the gas spring 330 to restrict the stretching and shortening of the gas spring 330 at the restricting position, and allows the stretching and shortening of the gas spring 330 at the allowance position. In this manner, the cabin 3 can be held to be lifted up by the restriction member 335 even when the gas spring 330 fails to hold the stretching due to a force applied to the gas spring 330 toward the direction of the shortening.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A working machine comprising:
   an operator seat disposed on a machine body;
   a floor step disposed below and anteriorly to the operator seat;
   a first operation lever disposed to right of the operator seat;
   a second operation lever disposed to left of the operator seat;
   a first cover arranged below the operator seat and above the floor step and attached to the machine body;
   a hinge disposed on a front end of the first cover;
   a second cover extending downward from the first cover toward the floor step, the second cover being jointed to the hinge and attached to the machine body;
   each of the first operation lever and the second operation lever comprising:
   a portion positioned above the first cover; and
   another portion positioned below the first cover.

2. The working machine according to claim 1, wherein:
   the second cover separates a space where the floor step is arranged from a space disposed below the operator seat and below the first cover.

3. The working machine according to claim 1, wherein:
   at least one of the first cover and the second cover comprises:
   a first plate and a second plate; and
   a plate shape forming a space for housing air between the first plate and the second plate.

4. The working machine according to claim 1, wherein:
   the hinge is formed of a portion connected to the first cover and the second cover, the portion having a thickness thinner than thicknesses of the first cover and the second cover.

5. The working machine according to claim 1, wherein:
   the first cover comprise a first main cover portion, the operator seat being arranged on the first main over portion; and
   the first main cover portion comprises:
   an upper wall; and a lower wall arranged below the upper wall and spaced from the upper wall, the upper wall and the lower wall being connected at right portions, left portions, front portions, and rear portions of the upper wall and the lower wall to each other;

the first main cover portion having a plate shape forming a space for housing air between the upper wall and the lower wall.

6. The working machine according to claim 5, wherein:
the second cover comprises a second main cover portion extending downward from a front portion of the first main cover portion along a vertical direction;
the second main cover portion comprises:
 a front wall; and
 a rear wall arranged behind the front wall and spaced from the front wall, the front wall and the rear wall being connected at right portions, left portions, front portions, and rear portions of the front wall and the rear wall to each other;
the second main cover portion having a plate shape forming a space for housing air between the front wall and the rear wall; and
an upper end of the second main cover portion being connected by the hinge to a front end of the first main cover portion.

7. The working machine according to claim 6, wherein:
the first cover further comprises:
 a first extending portion having a plate shape, the first extending portion protruding rightward from the first main cover portion and being attached to the machine body; and
 a second extending portion having a plate shape, the second extending portion protruding leftward from the first main cover portion and being attached to the machine body;
the second cover further comprises:
 a first attachment portion having a plate shape, the first attachment portion being provided on a right side of the second main cover portion and being attached to the machine body; and
 a second attachment portion having a plate shape, the second attachment portion being provided on a left side of the second main cover portion and being attached to the machine body.

8. The working machine according to claim 7, wherein:
the first extending portion comprises:
 an edge portion forming a first through hole, the first operation lever being inserted through the first through hole from an upper end of the first operation lever; and
the second extending portion comprises:
 an edge portion forming a second through hole, the second operation lever being inserted through the second through hole from an upper end of the second operation lever.

9. A working machine comprising:
a machine body;
an actuator;
a control valve to control a hydraulic operation fluid, the hydraulic operation fluid being used for operating the actuator;
a support base disposed on a front side of the machine body; and
a pedal disposed to left and another pedal disposed to right each configured to operate the control valve;

the support base comprising:
 an attachment portion disposed to left and another attachment portion disposed to right each attached to a bottom portion of the machine body, the attachment portions being arranged being separated from each other in a machine width direction;
 a leg portion disposed to left standing upward from the attachment portion disposed to left;
 another leg portion disposed to right standing upward from the attachment portion disposed to right;
 a mount portion configured to mount the control valve, the mount portion being connected to an upper end of the attachment portion disposed to left and to an upper end of the attachment portion disposed to right;
 a pedal attachment portion disposed to left to which the pedal disposed to left is attached, the pedal attachment portion being disposed above the attachment portion disposed to left; and
 a pedal attachment portion disposed to right to which the pedal disposed to right is attached, the pedal attachment portion being disposed above the attachment portion disposed to right; and
the control valve being arranged between the pedal attachment portion disposed to left and the pedal attachment portion disposed to right in a machine width direction and below the pedal attachment portion disposed to left and the pedal attachment portion disposed to right.

10. The working machine according to claim 9, wherein:
the support base further comprising:
 a support bracket disposed to left fixed to the attachment portion disposed to left;
 another support bracket disposed to right fixed to the attachment portion disposed to right;
 a foot step disposed to left fixed to the support bracket disposed to left; and
 another foot step disposed to right fixed to the support bracket disposed to right;
 the pedal attachment portion disposed to left being provided on the foot step disposed to left;
 the pedal attachment portion disposed to right being provided on the foot step disposed to right.

11. The working machine according to claim 9, further comprising:
a support shaft having an axis extending along the machine width direction;
a first cylindrical member and a second cylindrical member configured to turn about the axis of the support shaft;
the first cylindrical member being arranged below the pedal disposed to right and linked with the pedal disposed to right;
the second cylindrical member being arranged below the pedal disposed to left and linked with the pedal disposed to left; and
a link jointing the control valve to the first cylindrical member and the second cylindrical member.

12. The working machine according to claim 9, further comprising:
an operator seat mounted on the machine body; and
a floor step disposed in front of the operator seat, the floor step comprising:
 a foot step disposed to left;
 another foot step disposed to right; and
 a center step arranged between the foot step disposed to left and the foot step disposed to right;

the mount portion of the support base being disposed below the center step.

13. The working machine according to claim 9, further comprising:
a travel device; and
a transmission case to house the motive power transmission device for transmitting a motive power to the travel device, the transmission case being disposed inside the machine body;
the transmission case comprising:
a transmission case disposed to a left portion of the machine body; and
another transmission case disposed to a right portion of the machine body;
the control valve being mounted on the mount portion below the pedals between the transmission case disposed to the left portion and the transmission case disposed to the right portion.

14. The working machine according to claim 9, further comprising:
a cabin mounted on the machine body;
a boom disposed outward from the cabin in a machine outward direction and extending forward from behind the cabin; and
an operation tool disposed on a tip portion of the boom.

* * * * *